United States Patent
Sakai

(10) Patent No.: US 10,037,606 B2
(45) Date of Patent: Jul. 31, 2018

(54) VIDEO ANALYSIS APPARATUS, MONITORING SYSTEM, AND VIDEO ANALYSIS METHOD

(71) Applicant: NEC Corporation, Tokyo (JP)

(72) Inventor: Atsunori Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 14/628,866

(22) Filed: Feb. 23, 2015

(65) Prior Publication Data
US 2015/0256835 A1 Sep. 10, 2015

(30) Foreign Application Priority Data

Mar. 5, 2014 (JP) ................................. 2014-042282

(51) Int. Cl.
*H04N 7/12* (2006.01)
*G06T 7/20* (2017.01)
(Continued)

(52) U.S. Cl.
CPC ............ *G06T 7/20* (2013.01); *G06F 17/3079* (2013.01); *G06F 17/30781* (2013.01);
(Continued)

(58) Field of Classification Search
CPC ....................................................... G06T 7/20
See application file for complete search history.

(56) References Cited

U.S. PATENT DOCUMENTS 6,985,172 B1* 1/2006 Rigney .............. G06K 9/00335
348/149
2006/0252541 A1* 11/2006 Zalewski ................ A63F 13/02
463/36
(Continued)

FOREIGN PATENT DOCUMENTS

JP  2001-250118 A  9/2001
JP    3085003 U  4/2002
(Continued)

OTHER PUBLICATIONS

Press release issued by NEC, "NEC Video Surveillance Technologies Enable Three Times More Coverage," http://www.nec.com/en/press/201209/global_20120904_01.html, Sep. 4, 2012, English translation pp. 1-2; (Japanese document http://jpn.nec.com/press/201209/20120904_01.html (8 pages).
(Continued)

*Primary Examiner* — Tracy Y Li
(74) *Attorney, Agent, or Firm* — Wilmer Cutler Pickering Hale and Dorr LLP

(57) ABSTRACT

A video analysis apparatus includes: an identification unit that identifies whether each divided group includes a difference frame with a data size of a predetermined threshold value or more, the group being configured from video data which is encoded video data received from an imaging device captured a monitored base and is divided in units of groups each including a plurality of frames in a chronological order; a decoding unit that performs a decoding process on the plurality of frames of the group identified by the identification unit to include the difference frame with the data size of the predetermined threshold value or more; and a detection unit that performs image analysis on the decoded each frame to detect a moving object.

17 Claims, 12 Drawing Sheets

(51) Int. Cl.
*G08B 13/196* (2006.01)
*G06F 17/30* (2006.01)
*G06T 7/254* (2017.01)

(52) U.S. Cl.
CPC .. *G06F 17/30799* (2013.01); *G06F 17/30811* (2013.01); *G06T 7/254* (2017.01); *G08B 13/19602* (2013.01); *G06T 2207/10016* (2013.01); *G06T 2207/30232* (2013.01)

(56) References Cited

U.S. PATENT DOCUMENTS

| | | | | |
|---|---|---|---|---|
| 2010/0245085 | A1* | 9/2010 | Mochizuki | G06Q 10/087 340/540 |
| 2011/0063162 | A1* | 3/2011 | Kojima | G01S 7/066 342/164 |
| 2012/0179742 | A1* | 7/2012 | Acharya | H04N 7/18 709/202 |
| 2016/0234523 | A1* | 8/2016 | Hattori | H04N 21/4728 |

FOREIGN PATENT DOCUMENTS

| | | |
|---|---|---|
| JP | 2003-111061 A | 4/2003 |
| JP | 2008-131611 A | 6/2008 |
| JP | 2009-159260 A | 7/2009 |
| JP | 2012-244574 A | 12/2012 |
| JP | 2013-125304 A | 6/2013 |
| WO | WO-2009/025357 A1 | 2/2009 |

OTHER PUBLICATIONS

Japanese Office Action issued by the Japan Patent Office for Japanese Application No. 2014-042282 dated Nov. 14, 2017 (7 pages).

* cited by examiner

Fig. 5

| CAMERA ID | GOP ID | CAMERA CAPTURING TIME |
|---|---|---|
| ⋮ | ⋮ | ⋮ |
| 2 | 539 | 2013/09/11 16:10:55:235 |
| 2 | 540 | 2013/09/11 16:10:55:735 |
| 2 | 541 | 2013/09/11 16:10:56:235 |
| ⋮ | ⋮ | ⋮ |

Fig. 6

| CAMERA ID | ANALYSIS TARGET INFORMATION | MOVING OBJECT DETECTION STATE INFORMATION | IDENTIFICATION COMPLETION GOP ID |
|---|---|---|---|
| 1 | ANALYSIS TARGET | NON-DETECTION | 1013 |
| 2 | ANALYSIS TARGET | DURING DETECTION | 540 |
| 3 | NON-ANALYSIS TARGET | — | — |
| ⋮ | ⋮ | ⋮ | ⋮ |

Fig. 7

| ANALYSIS SERVER ID | ANALYSIS STATE INFORMATION | CAMERA ID DURING ANALYSIS | GOP ID DURING ANALYSIS |
|---|---|---|---|
| 1 | ANALYSIS STANDBY | — | — |
| 2 | ANALYSIS STANDBY | — | — |
| 3 | DURING ANALYSIS | 2 | 540 |
| ⋮ | ⋮ | ⋮ | ⋮ |

VIDEO ANALYSIS APPARATUS, MONITORING SYSTEM, AND VIDEO ANALYSIS METHOD

This application is based upon and claims the benefit of priority from Japanese Patent Application No. 2014-042282, filed on Mar. 5, 2014, the disclosure of which is incorporated herein in its entirety by reference.

TECHNICAL FIELD

The present invention relates to a video analysis apparatus, a monitoring system, and a video analysis method.

BACKGROUND ART

Recently, there have been increased demands for a large scale monitoring system that analyzes a plurality of camera videos in realtime to detect a moving object such as a person or an object, and automatically alerts an administrator. For example, there has been considered a case in which when a person has entered into an entry prohibited area, even though an administrator does not see a video, an alert is automatically issued to allow the administrator to know the intrusion.

In such a monitoring system, video data is transmitted from each network camera (IP (Internet Protocol) camera) to a monitoring center (also called a monitoring base) that performs monitoring. The video data is normally encoded by a video data compression standard such as an MPEG (Moving Picture Experts Group)-4 or an MPEG-2, and is transmitted from the network camera to the monitoring center.

According to a compression standard of high compression such as an MPEG-4 standard (ISO/IEC 14496 or ITU-T H.264) or an MPEG-2 standard (ISO/IEC 13818) often used in a large scale monitoring system, compression processing is performed by a technology such as inter-frame prediction. Therefore, when the above-described standard is compared with a standard such as a Motion JPEG (ISO/IEC 29199-3:2010), the above-described standard has characteristics that an operation amount during decoding is further increased and a load of a CPU (Central Processing Unit) during decoding is increased.

Japanese Laid-open Patent Publication No. 2013-125304 (Patent Literature 1) discloses a technique for shortening a video analysis time. In detail, Patent Literature 1 discloses a parallel video analysis device that obtains a plurality of image frames located at any integral multiple of a predetermined thinned-out image frame interval from an image frame at the beginning of video data. Furthermore, the parallel video analysis device starts detection processing of event information in the video data from each image frame at the thinned-out image frame interval temporally in parallel.

Furthermore, a method for searching subtitles in a video and reducing a processing amount is disclosed in Japanese Laid-open Patent Publication No. 2009-159260.

Furthermore, a method for calculating the number of TS packets included in respective frames as a frame data quantity of the frame according to a frame start position included in inputted TS packets of video communication, and determining a frame type according to a large/small relationships between the frame data quantities of the frames is disclosed in International Publication No. 2009/025357.

In addition, an example of a large scale video processing technologies is disclosed in the URL (http://jpn.nec.com/press/201209/20120904_01.html: press release issued by NEC dated Sep. 4, 2012).

SUMMARY

Accordingly, an object of the present invention is to provide an apparatus, a system, and a method capable of reducing costs more preferably.

A video analysis apparatus of an exemplary aspect of the present invention includes: an identification unit that identifies whether each divided group includes a difference frame with a data size of a predetermined threshold value or more, the group being configured from video data which is encoded video data received from an imaging device captured a monitored base and is divided in units of groups each including a plurality of frames in a chronological order; a decoding unit that performs a decoding process on the plurality of frames of the group identified by the identification unit to include the difference frame with the data size of the predetermined threshold value or more; and a detection unit that performs image analysis on the decoded each frame to detect a moving object.

A monitoring system of an exemplary aspect of the present invention is a monitoring system for monitoring a monitored base, which including: a management server that receives decoded video data from an imaging device captured the monitored base, and divides and manages the received video data in units of groups each including a plurality of frames in a chronological order; an identification server that identifies whether each divided group includes a difference frame with a data size of a predetermined threshold value or more, the group being configured from the divided video data; an analysis server that performs a decoding process on the plurality of frames of the group identified by the identification server to include the difference frame with the data size of the predetermined threshold value or more and performs image analysis on the decoded each frame to detect a moving object; and a monitoring terminal including a display unit that displays information representing that a moving object has been detected according to an instruction from the management server when the analysis server has detected the moving object.

A video analysis method of an exemplary aspect of the present invention includes: identifying whether each divided group includes a difference frame with a data size of a predetermined threshold value or more, the group being configured from video data which is encoded video data received from an imaging device captured a monitored base and is divided in units of groups each including a plurality of frames in a chronological order; performing a decoding process on the plurality of frames of the group identified to include the difference frame with the data size of the predetermined threshold value or more; and performing image analysis on the decoded each frame to detect a moving object.

In addition, a computer program causing a computer to realize the above-described apparatus, system, and method, and a computer-readable recording medium storing the computer program are also included in the scope of the present invention.

BRIEF DESCRIPTION OF THE DRAWINGS

Exemplary features and advantages of the present invention will become apparent from the following detailed description when taken with the accompanying drawings in which:

FIG. 5 is a diagram illustrating an example of data stored in a time information storage unit in the monitoring system according to the first exemplary embodiment of the present invention;

FIG. 6 is a diagram illustrating an example of data stored in a video management information storage unit in the monitoring system according to the first exemplary embodiment of the present invention;

FIG. 7 is a diagram illustrating an example of data stored in an analysis server management information storage unit in the monitoring system according to the first exemplary embodiment of the present invention;

EXEMPLARY EMBODIMENT

Figure 1:
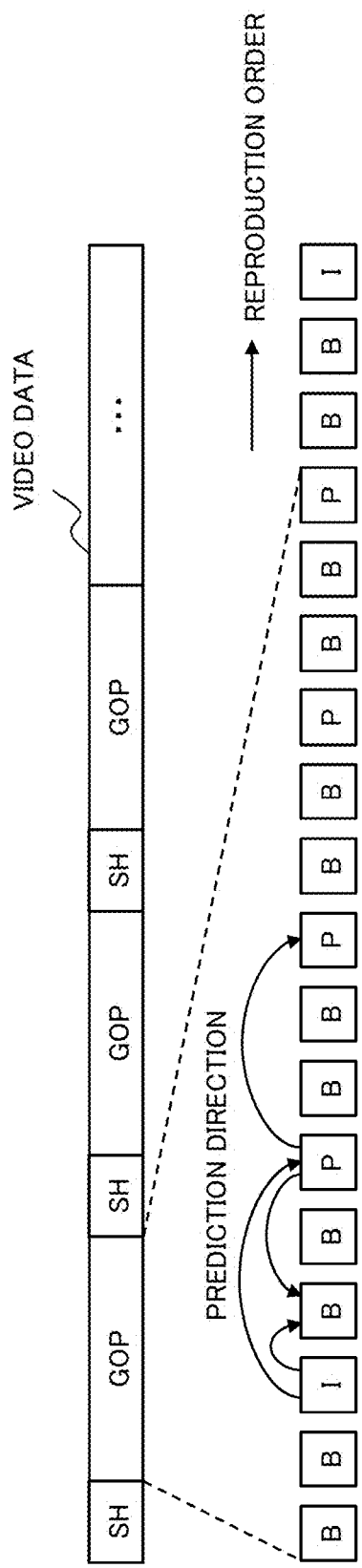
FIG. 1 is a diagram illustrating a configuration of video data encoded by a compression coding scheme conforming to an MPEG standard.

First, compression coding data used in a monitoring system, a monitoring apparatus, or a video analysis apparatus according to each exemplary embodiment of the present invention will be described below with reference to FIG. 1. FIG. 1 is a diagram illustrating a configuration of video data encoded by a compression coding scheme conforming to an MPEG standard.

As illustrated in FIG. 1, video data includes a sequence header (SH) and a GOP (Group Of Picture). The sequence header includes initial data required by a decoder for reproduction. The GOP is obtained by grouping a predetermined number of frames into one group in a chronological order.

In the case of using a compression coding scheme conforming to an MPEG standard, an original video is compression-coded into frames (pictures) of I, P, and B, resulting in the generation of a video stream such as an elementary stream. The I-frame (Intra-frame) is a frame in which an encoding process is performed in its own frame. The P-frame (Predictive-frame), as illustrated in FIG. 1, is a frame in which one directional inter-frame prediction is performed from the nearest past I-frame or P-frame and data corresponding to the difference has been encoded. The B-frame (Bidirectional-frame) is a frame in which bidirectional inter-frame prediction is performed from the nearest past and future I-frame or P-frame and data corresponding to the difference has been encoded. In addition, in FIG. 1, the I-frame, the P-frame, and the B-frame are indicated by "I", "P", and "B", respectively. Furthermore, in FIG. 1, the arrow indicates a prediction direction. A frame positioned at a start point of the arrow indicates a frame to be referred and a frame positioned at an end point indicates a frame to be predicted.

As illustrated in FIG. 1, the GOP in the present exemplary embodiment includes 15 frames of "B, B, I, B, B, P, B, B, P, B, B, P, B, B, and P" in a reproduction order.

In addition, the number of frames included in one GOP and the number of B-frames inserted between the I-frame and the P-frame are not limited thereto. These may also be configured to be changed by the setting at the time of encoding. For example, it may be possible to employ a configuration in which the B-frame is not included such as "P, P, I, P, P, P, P, P, P, P, P, P, P, P, and P", or a configuration in which one B-frame is included between the P-frame and the I or P-frame such as "B, P, I, B, P, B, P, B, P, B, P, B, P, B, and P".

Furthermore, in the present exemplary embodiment, the P-frame and the B-frame are also called difference frames. Furthermore, a frame referred to in order to predict the P-frame and the B-frame is also called a reference frame. The difference frame has information of difference between reference frame of past or past and future and image data at that time point. Therefore, when there is less difference between pigment information of the reference frame and pigment information of the image data at that time point, the data size of the difference frame is a value near 0. Furthermore, when there is a large difference between the pigment information of the reference frame and the pigment information of the image data at that time point, the data size of the difference frame is also increased.

Figure 2:
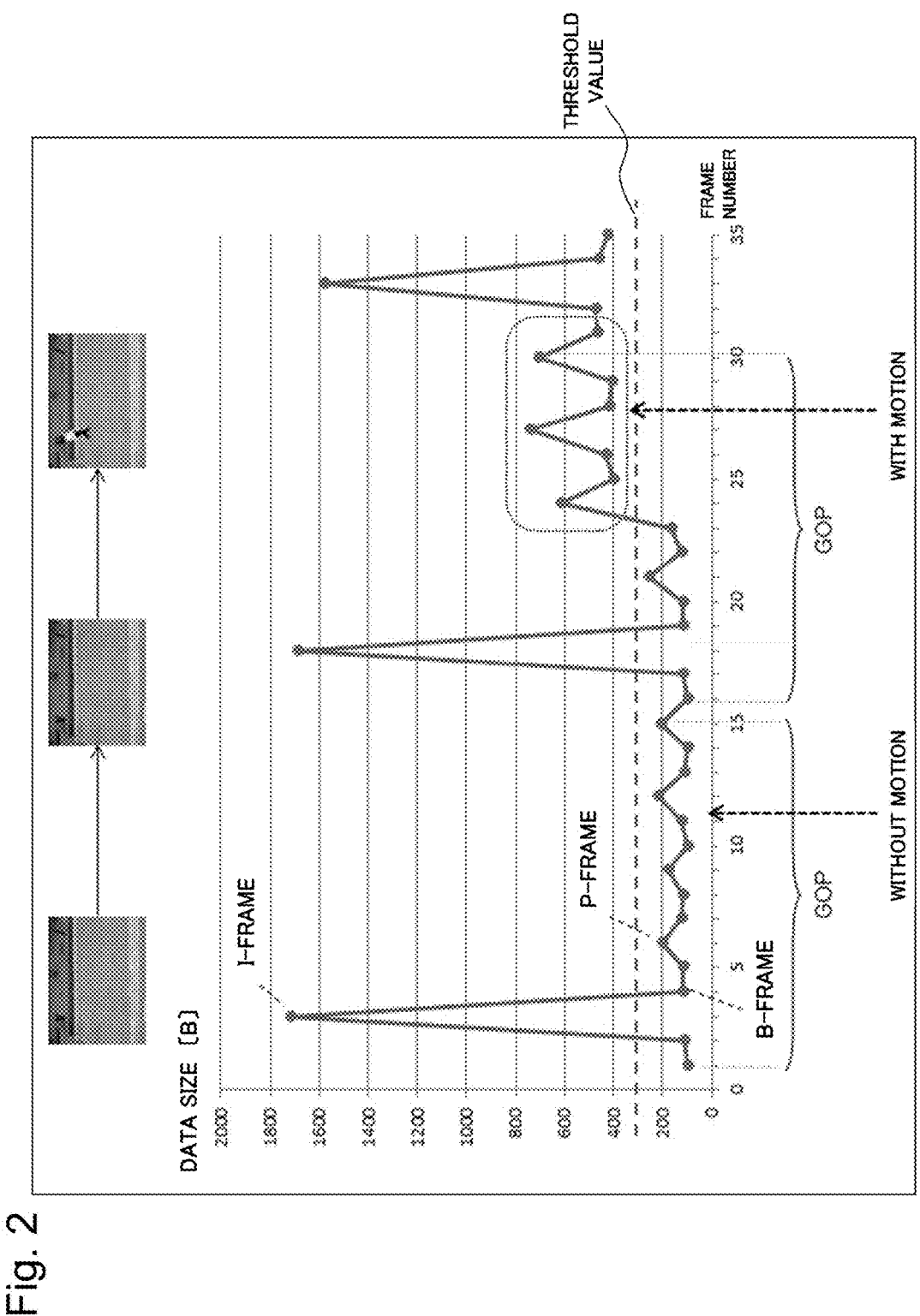
FIG. 2 is a graph illustrating an example of a size of each frame corresponding to a monitoring camera video.

FIG. 2 is a graph illustrating an example of a frame size (data size) of each frame corresponding to a monitoring camera video. Among three images illustrated at an upper portion of FIG. 2, when the left image is set as a standard image, the center image is an image after the standard image is captured and then a predetermined time passes, and the right image is an image after the center image is captured and then a predetermined time passes. The center image indicates that there is less change from the left image, and the right image indicates that a person (a moving object) has entered into the left image and the center image (there is a change). Furthermore, in the graph illustrated in FIG. 2, a horizontal axis denotes a frame number of a frame corresponding to an upper image, and a vertical axis denotes a data size (a byte) in each frame. In addition, the frame number is assumed to be assigned from 1 in a reproduction order. That is, frame numbers from 1 to 15 are assigned to "B, B, I, B, B, P, B, B, P, B, B, P, B, B, and P" of an initial GOP in a reproduction order. Furthermore, image data and frames illustrated at an upper portion approximately correspond to each other. For example, a frame corresponding to the standard image is any one of the frames with frame numbers of 1 to 6, a frame corresponding to the center image is any one of the frames with frame numbers of 14 to 21, and a frame corresponding to the right image is any one of the frames with frame numbers of 25 to 31.

As in the center image in which no person is captured as illustrated in FIG. 2, a data size of a difference frame when there is no change from the left image has a value of approximately 0 as illustrated in the graph of FIG. 2. However, as in the right image of FIG. 2, when a person enters into the video, the data size of the difference frame has a value larger than that of the data size of the difference frame when there is no change, as illustrated in a portion surrounded by a dotted line of FIG. 2.

In each exemplary embodiment of the present invention, a video section (a group), in which there is a motion in a video, is identified using the difference frame in such compression video data as a feature quantity.

First Exemplary Embodiment

A first exemplary embodiment of the present invention will be described in detail with reference to the accompanying drawings.

Figure 3:
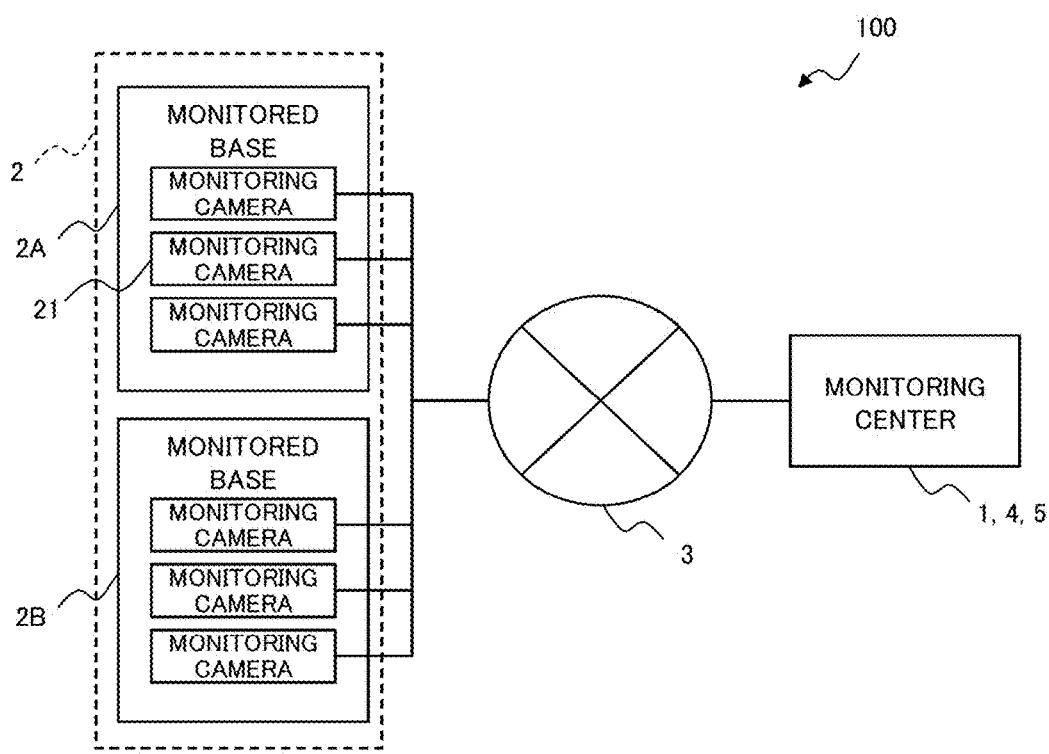
FIG. 3 is a diagram illustrating an example of a configuration of a monitoring system according to a first exemplary embodiment of the present invention.

FIG. 3 is a diagram illustrating an example of a configuration of a monitoring system according to the present exemplary embodiment. As illustrated in FIG. 3, a monitoring system 100 according to the present exemplary embodiment includes a monitored base 2 (2A and 2B) and a monitoring center (a monitoring base) 1 for monitoring the monitored base 2. The monitored base 2 and the monitoring center 1 are connected to each other through a network 3. The monitoring center 1 will be described with reference to another drawing.

The network 3, for example, is a public communication network such as the Internet, a WAN (Wide Area Network), or the like.

The monitored base 2 is a base to be monitored from the monitoring center 1. In the present exemplary embodiment, the case in which the number of bases to be monitored is two (the monitored bases 2A and 2B) as illustrated in FIG. 3 will be described as an example; however, the present invention is not limited thereto. The base to be monitored may be provided in a plural number. In addition, in the present exemplary embodiment, the monitored bases 2A and 2B will be collectively called the monitored base 2.

Furthermore, as illustrated in FIG. 3, in each monitored base, a plurality of monitoring cameras (imaging devices) 21 are installed. In FIG. 3, it is assumed that three monitoring cameras 21 are installed in each monitored base. In addition, in the present invention, the number of the monitoring cameras 21 installed in each monitored base is not limited to 3. It is sufficient if the number of the monitoring cameras 21 installed in each monitored base is 1 or more.

The monitoring cameras 21, for example, are network cameras. In addition, the monitoring cameras 21 according to the present exemplary embodiment are not limited thereto, and may be analog cameras. The monitoring camera 21 includes an encoder and the like. The monitoring camera 21 compression-codes a captured video by using a video data compression standard such as an MPEG through the encoder, and transmits the encoded video to the monitoring center 1 via the network 3. Furthermore, as described above, when the monitoring camera 21 is an analog camera, an encoder provided in each monitored base may also be configured to compression-code a captured video and transmit the encoded video to the monitoring center 1 via the network 3. In addition, each frame of the video data transmitted by the monitoring camera 21 includes a captured time.

(Monitoring Center 1)

Figure 4:
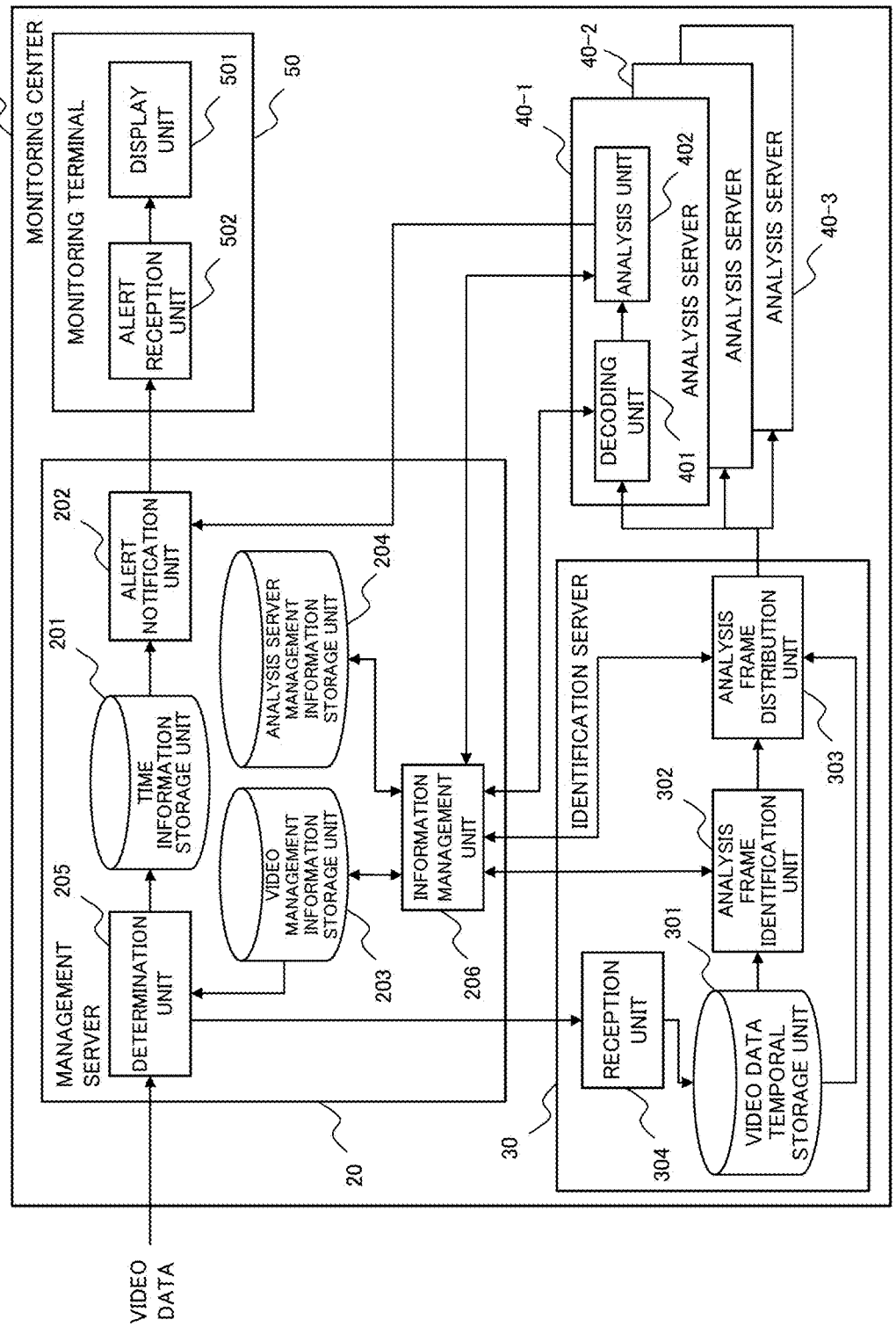
FIG. 4 is a functional block diagram illustrating an example of a functional configuration of a monitoring center in the monitoring system according to the first exemplary embodiment of the present invention.

Next, the functions of the monitoring center 1 of the monitoring system 100 according to the present exemplary embodiment will be described. FIG. 4 is a functional block diagram illustrating an example of a functional configuration of the monitoring center 1. As illustrated in FIG. 4, the monitoring center 1 includes a management server 20, an identification server 30, one or a plurality of analysis servers 40 (40-1 to 40-3), and a monitoring terminal 50 used when an administrator (a monitoring person) monitors each monitored base.

(Management Server 20)

The management server 20 is a server for managing the whole of the monitoring center 1. As illustrated in FIG. 4, the management server 20 includes a time information storage unit 201, an alert notification unit 202, a video management information storage unit 203, an analysis server management information storage unit (an analysis information storage unit) 204, a determination unit 205, and an information management unit 206.

The determination unit 205 receives the video data transmitted from any monitoring camera 21 of the monitored base 2 via the network 3 in the state compressed by the MPEG standard. When an analysis process (which will be described later) is performed on the received video data in realtime, the determination unit 205 transmits the video data to the identification server 30. When the received video is a video needed to be preserved for a long time, the determination unit 205 transmits the video data to a recording server (not illustrated). In this case, the video data is recorded by the recording server in the state of the compressed video data. Furthermore, the recording server may also be configured to transmit the recorded video data to the identification server 30. Whether the determination unit 205 transmits the received video data to the identification server 30 is performed by referring to the video management information storage unit 203.

Furthermore, the determination unit 205 assigns an identifier (called a camera ID (IDentifier)) for uniquely specifying a monitoring camera 21 to the monitoring camera 21 transmitted video data. In addition, it may be possible to employ a configuration in which an associated camera ID is assigned in advance to an IP address and the like of a monitoring camera transmitted video data.

Furthermore, the determination unit 205 divides the received video data in units of GOPs, and assigns, to each GOP, a GOP ID (a group identifier) for uniquely specifying each GOP. The determination unit 205 associates a camera ID, which indicates a monitoring camera 21 captured a frame (image data) included in a GOP, a GOP ID indicating the GOP, and a time (a camera capturing time), at which the frame included in the GOP has been captured, with one another for each GOP, and stores an association result in the time information storage unit 201. In addition, the camera capturing time, for example, may be a capturing time of an initial frame included in each GOP, or capturing times of other frames. Furthermore, the determination unit 205 transmits the video data to the identification server 30 with the camera ID and the GOP ID. Furthermore, when transmitting the video data to the identification server 30, the determination unit 205 may also transmit the video data to the recording server.

The time information storage unit 201 stores, the GOP ID of each GOP, the camera ID indicating the monitoring camera 21 captured the video data including the GOP specified by the GOP ID, and the camera capturing time indicating the time, at which any one of frames included in the GOP specified by the GOP ID has been captured in units of GOPs of the video data received in the determination unit 205. The GOP ID, the camera ID and the camera capturing time are associated with one another. An example of data stored in the time information storage unit 201 is illustrated in FIG. 5. FIG. 5 is a diagram illustrating an example of data stored in the time information storage unit 201 according to the present exemplary embodiment. As illustrated in FIG. 5, a camera ID, a GOP ID, and a camera capturing time are associated with one another and are stored in the time information storage unit 201.

The alert notification unit 202 receives a camera ID and a GOP ID transmitted from the analysis servers 40. The alert notification unit 202 refers to the time information storage unit 201, and acquires camera capturing time at which the camera ID and the GOP ID stored in the time information storage unit 201 coincide with the received camera ID and GOP ID, respectively. In this way, the alert notification unit 202 can acquire an actual time at which a monitoring camera 21 detected a moving object has captured a video. Then, the alert notification unit 202 transmits an instruction for displaying information, which represents that the moving object has been detected, to the monitoring terminal 50 with the acquired camera capturing time. Furthermore, the alert notification unit 202 may also transmit the camera ID to the monitoring terminal 50 at this time.

The video management information storage unit 203 stores, information, which represents whether video data transmitted from each monitoring camera 21 of the monitored base 2 to the management server 20 is an analysis target. The stored information is associated with camera ID indicating the monitoring cameras 21. Furthermore, the video management information storage unit 203 stores, information, which represents whether a moving object is included in video data to be analyzed (the moving object has been detected), associated with the camera ID and information, which represents whether an identification process to which GOP in the video data to be analyzed has been performed, associated with the camera ID. The identification process is a process to identify whether there is motion.

An example of data stored in the video management information storage unit 203 is illustrated in FIG. 6. FIG. 6 is a diagram illustrating an example of data stored in the video management information storage unit 203 according to the present exemplary embodiment. As illustrated in FIG. 6, the video management information storage unit 203 stores a camera ID, analysis target information, moving object detection state information, and an identification completion GOP ID in association with each other.

The analysis target information is information representing whether video data of a monitoring camera 21 specified by the camera ID is an analysis target. In FIG. 6, in a column of the analysis target information, when video data captured by the monitoring camera 21 specified by the camera ID is an analysis target, a character string of an "analysis target" is included, and when the video data is not the analysis target, a character string of a "non-analysis target" is included. In addition, the information included in the column of the analysis target information is not limited thereto, and may be information representing whether video data of the monitoring cameras 21 is an analysis target. Furthermore, the analysis target information may be set in advance by an administrator, and for example, may be automatically set in response to a day of the week or a time period.

Furthermore, the moving object detection state information (detection information) is information representing whether a moving object is included in the video data to be analyzed (the moving object has been detected). That is, the moving object detection state information is information representing whether the moving object has been detected from at least one frame included in the GOP of the video data to be analyzed as a result of image analysis. In FIG. 6, in a column of the moving object detection state information, when the moving object has been detected, a character string of "during detection" representing that the moving object has been detected is included, and when the moving object has not been detected, a character string of "non-detection" is included. Furthermore, the column of the moving object detection state information includes a NULL ("-" in FIG. 6) representing that the information is not included with respect to video data not to be analyzed. In addition, the information included in the column of the moving object detection state information is not limited thereto, and may be information representing an outside of target and information representing whether a moving object has been detected. For example, the value of the moving object detection state information for a row of a certain camera ID may also be made empty, thereby representing that information on the moving object detection state information is not included in the row of the certain camera ID.

Furthermore, the identification completion GOP ID is information representing whether an identification process to which GOP in the video data to be analyzed has been performed. The identification process is a process to identify whether there is motion. A column of the identification completion GOP ID includes information ("-" in FIG. 6) representing a GOP ID completed the identification process or out of the identification process. For example, a column, in which the cameral ID of FIG. 6 is "1", represents that the identification process has been performed up to a GOP with a GOP ID of "1013" with respect to video data captured by a monitoring camera 21 with a camera ID of "1". In addition, similarly to the moving object detection state information, the value of the column of the identification completion GOP ID may also be made empty, thereby representing that video data is out of the identification process.

When video data is received, the aforementioned determination unit 205 refers to the analysis target information stored in the video management information storage unit 203 and associated with a camera ID indicating a monitoring camera 21 captured the video data, and determines whether the video data is an analysis target.

The analysis server management information storage unit 204 stores analysis server ID which is identifiers for identifying each of one or a plurality of analysis servers 40, and information representing whether the analysis of video data is performed by the analysis servers 40 specified by the analysis server ID. Furthermore, when analysis for a certain GOP of video data is performed by a certain analysis server 40, a camera ID, which indicates a monitoring camera 21 captured the video data being analyzed, and a GOP ID, which indicates the GOP of the video data being analyzed, are associated with the analysis server ID and are stored in the analysis server management information storage unit 204.

An example of data stored in the analysis server management information storage unit 204 is illustrated in FIG. 7. FIG. 7 is a diagram illustrating an example of data stored in the analysis server management information storage unit 204 according to the present exemplary embodiment. As illustrated in FIG. 7, an analysis server ID, analysis state information, a camera ID during analysis, and a GOP ID during analysis are associated with one another and are stored in the analysis server management information storage unit 204.

The analysis server ID is an identifier for identifying the analysis server 40, which will be described later. Furthermore, the analysis state information is information representing whether the analysis of video data is performed by an analysis server 40 specified by the analysis server ID. A column of the analysis state information includes a character string of "during analysis" when the analysis of video data is being performed, and a character string of "analysis standby" when the analysis of video data is not performed. In addition, information included in the column of the analysis state information is not limited thereto, and it is sufficient if the information is information representing whether analysis is being performed.

Furthermore, the camera ID during analysis is a camera ID indicating a monitoring camera 21 captured video data being analyzed by the analysis server 40 having the analysis state information of "during analysis". Furthermore, the GOP ID during analysis is a GOP ID indicating the GOP of the video data being analyzed by the analysis server 40 having the analysis state information of "during analysis". In addition, in the camera ID during analysis and the GOP ID during analysis when the analysis state information is "analysis standby", information ("-" in FIG. 7) representing that there is no corresponding information (that is, no analysis is performed by a relevant analysis server) is included. In addition, a column relevant to the "analysis standby" (a camera ID during analysis and a GOP ID during analysis associated with "analysis standby") may also be made empty, thereby representing that the relevant analysis server does not perform analysis. FIG. 7 illustrates that an analysis server with the analysis server ID of "3" performs the analysis of video data captured by monitoring camera 21 with the camera ID of "2" and the GOD ID of "540".

The information management unit 206 manages the video management information storage unit 203 and the analysis server management information storage unit 204. When a reference instruction or an update instruction for the video management information storage unit 203 or the analysis server management information storage unit 204 is received from another server, the information management unit 206 performs processing corresponding to the received instruction for the storage unit relevant to the instruction. Then, the information management unit 206 transmits a result of the processing to the server transmitted the instruction.

(Identification Server 30)

As illustrated in FIG. 4, the identification server 30 includes a video data temporal storage unit 301, an analysis frame identification unit 302, an analysis frame distribution unit (a transmission unit) 303, and a reception unit 304.

The video data temporal storage unit 301 temporally stores video data received in the reception unit 304 with camera ID and a GOD ID received with the video data.

The reception unit 304 receives video data transmitted from the management server 20, with the camera ID and the GOD ID. The reception unit 304 associates the received video data, camera ID, and GOD ID with one another, and stores a result of the association in the video data temporal storage unit 301.

The analysis frame identification unit 302 transmits the reference instruction for referring to the video management information storage unit 203 or the analysis server management information storage unit 204 to the management server 20. Then, the analysis frame identification unit 302 receives a response for the reference instruction from the management server 20. Furthermore, the analysis frame identification unit 302 transmits the update instruction for updating the content of the video management information storage unit 203 to the management server 20.

The analysis frame identification unit 302 acquires the GOP ID as the response of the reference instruction for referring to the video management information storage unit 203. When frames included in a GOP indicated by the next GOP ID of the acquired GOP ID are accumulated in the video data temporal storage unit 301, the analysis frame identification unit 302 acquires the GOP from the video data temporal storage unit 301. At this time, the analysis frame identification unit 302 may acquire the GOP ID and the camera ID with the GOP.

Furthermore, the analysis frame identification unit 302 confirms whether a difference frame in the acquired GOP has a data size of a predetermined threshold value or more. In detail, the analysis frame identification unit 302 confirms whether the acquired GOP, for example, satisfies at least one of the following (a) to (d).

(a) The acquired GOP includes a B-frame with a data size of the predetermined threshold value or more.

(b) The acquired GOP includes a P-frame with a data size of the predetermined threshold value or more.

(c) The average value of data sizes of difference frames (the P-frame and the B-frame) is the predetermined threshold value or more.

(d) The difference frames (the P-frame and the B-frame) with the data sizes of the predetermined threshold value or more are continuous by a predetermined number or more.

Hereinafter, a description will be provided for the case in which the predetermined threshold value is a value (300 bytes) indicated by the broken line of FIG. 2 and the frame numbers of the frames included in the acquired GOP are 16 to 30. It can be understood that the part (difference frames with frame numbers of 24 to 30) surrounded by the dotted line of FIG. 2 satisfies at least the (a) and (b).

When the difference frame in the acquired GOP have data size of the predetermined threshold value or more, the analysis frame identification unit 302 selects the GOP as a GOP which may include a moving object, and transmits the GOP to the analysis frame distribution unit 303. Herein, the video data received in the reception unit 304 is compression-coded data transmitted from the monitoring camera 21. When selecting the GOP which may include a moving object, the analysis frame identification unit 302 uses a data size of a frame (a difference frame) acquired in a encoded state. Therefore, the analysis frame identification unit 302 can perform the selection of the GOP with a smaller throughput at a high speed.

In addition, the analysis frame identification unit 302 may be configured to confirm that the acquired GOP satisfies all the following (a) to (d), or may be configured to confirm that the acquired GOP satisfies a predetermined number (for example, two and the like).

The analysis frame distribution unit 303 specifies an analysis server 40 performing no analysis process among one or a plurality of analysis servers 40. In detail, in order to specify the analysis server 40 performing no analysis process, the analysis frame distribution unit 303 transmits the reference instruction for referring to the analysis server management information storage unit 204 to the management server 20. Then, the analysis frame distribution unit 303 receives a response for the reference instruction from the management server 20.

Furthermore, the analysis frame distribution unit 303 transmits the GOP transmitted from the analysis frame identification unit 302, the GOP ID of the GOP, and the camera ID of the monitoring camera 21 captured the GOP to any one of the specified analysis servers 40. In addition, the GOP ID and the camera ID may also be transmitted with the GOP when the GOP is transmitted from the analysis frame identification unit 302.

Furthermore, when moving object detection state information for a GOP ID immediately preceding to an analysis target GOP is "during detection", the analysis frame distribution unit 303 acquires the analysis target GOP from the video data temporal storage unit 301 with the GOP ID and the camera ID, and transmits the analysis target GOP to any one of the specified analysis servers 40.

Herein, the reason that the analysis frame distribution unit 303 transmits the video data to the analysis server 40 in unit of GOP other than in unit of frame is because it is not possible to decode the difference frame when there is not a frame of a reference source of the difference frame. Herein, when the video data is an open GOP such as the GOP illustrated in FIG. 1 (when the video data has been compression-coded in the form of a GOP starting from a B-frame referring to the final P-frame of an immediately preceding GOP and an initial I-frame of the GOP), the analysis frame distribution unit 303 may also be configured to transmit backward and forward GOPs to the analysis server. Furthermore, when a plurality of reference frames is video data compression-coded by H.264 that is effective, the analysis frame distribution unit 303 may also transmit each frame between IDR (Instantaneous Decoder Refresh) frames to the analysis server 40. Furthermore, in the case of video data compression-coded by other standards, the analysis frame distribution unit 303 may also transmit frames included in the video data to the analysis server 40 in decodable units. In this way, it is sufficient if the analysis frame distribution unit 303 is configured to transmit frames necessary for decoding to the analysis server 40.

(Analysis Server 40)

As illustrated in FIG. 4, the monitoring system 100 includes one or a plurality of analysis servers (video analysis unit) 40 (40-1 to 40-3). In addition, in the present exemplary embodiment, the case in which the number of the analysis servers 40 is three as illustrated in FIG. 4 will be described; however, the present invention is not limited thereto. Furthermore, each analysis server 40-1, 40-2, or 40-3 has the same configuration. In addition, in the present exemplary embodiment, the analysis servers 40-1 to 40-3 will be collectively called the analysis server 40.

As illustrated in FIG. 4, each analysis server 40 includes a decoding unit 401 and an analysis unit (a detection unit) 402.

The decoding unit 401 receives the GOP, the GOP ID, and the camera ID transmitted from the identification server 30. Then, the decoding unit 401 performs a decoding process on the received GOP. The decoding unit 401 transmits the decoded GOP to the analysis unit 402.

Furthermore, the decoding unit 401 transmits the update instruction for updating the content of the analysis server management information storage unit 204 to the management server 20.

The analysis unit 402 performs video analysis (image analysis) on each frame of the GOP transmitted from the decoding unit 401. In this way, the analysis unit 402 confirms whether a moving object is included in the frame. In addition, in the present exemplary embodiment, since the analysis unit 402 performs the image analysis by using a general technique, a detailed description of the image analysis will be omitted.

Furthermore, the analysis unit 402 transmits the update instruction for updating the content of the video management information storage unit 203 and the analysis server management information storage unit 204 to the management server 20.

Furthermore, the analysis unit 402 transmits notification indicating that the moving object has been detected to the management server 20. In detail, the analysis unit 402 transmits, to the management server 20, the GOP ID of a GOP in which the moving object has been detected, and a camera ID indicating a monitoring camera 21 captured the GOP.

(Monitoring Terminal 50)

As illustrated in FIG. 4, the monitoring terminal 50 includes a display unit 501 and an alert reception unit 502. The alert reception unit 502 receives an instruction for displaying an alert, which is transmitted from the management server 20, with the camera ID and the camera capturing time. When the instruction for displaying an alert is received, the alert reception unit 502 allows the alert to be displayed on the display unit 501.

The display unit 501 displays the alert according to the instruction of the alert reception unit 502. At this time, the display unit 501 displays information, which represents that a moving object has been detected, as the alert. The information, which represents that a moving object has been detected, for example, includes a time (a camera capturing time at which the moving object has been captured) at which the moving object has been detected. Furthermore, the display unit 501 may also have a function of reproducing a video of the time at which the moving object has been detected. In this way, the monitoring terminal 50 can provide an administrator with the information representing that the moving object has been detected.

(Flow of Identification Process)

Figure 8:
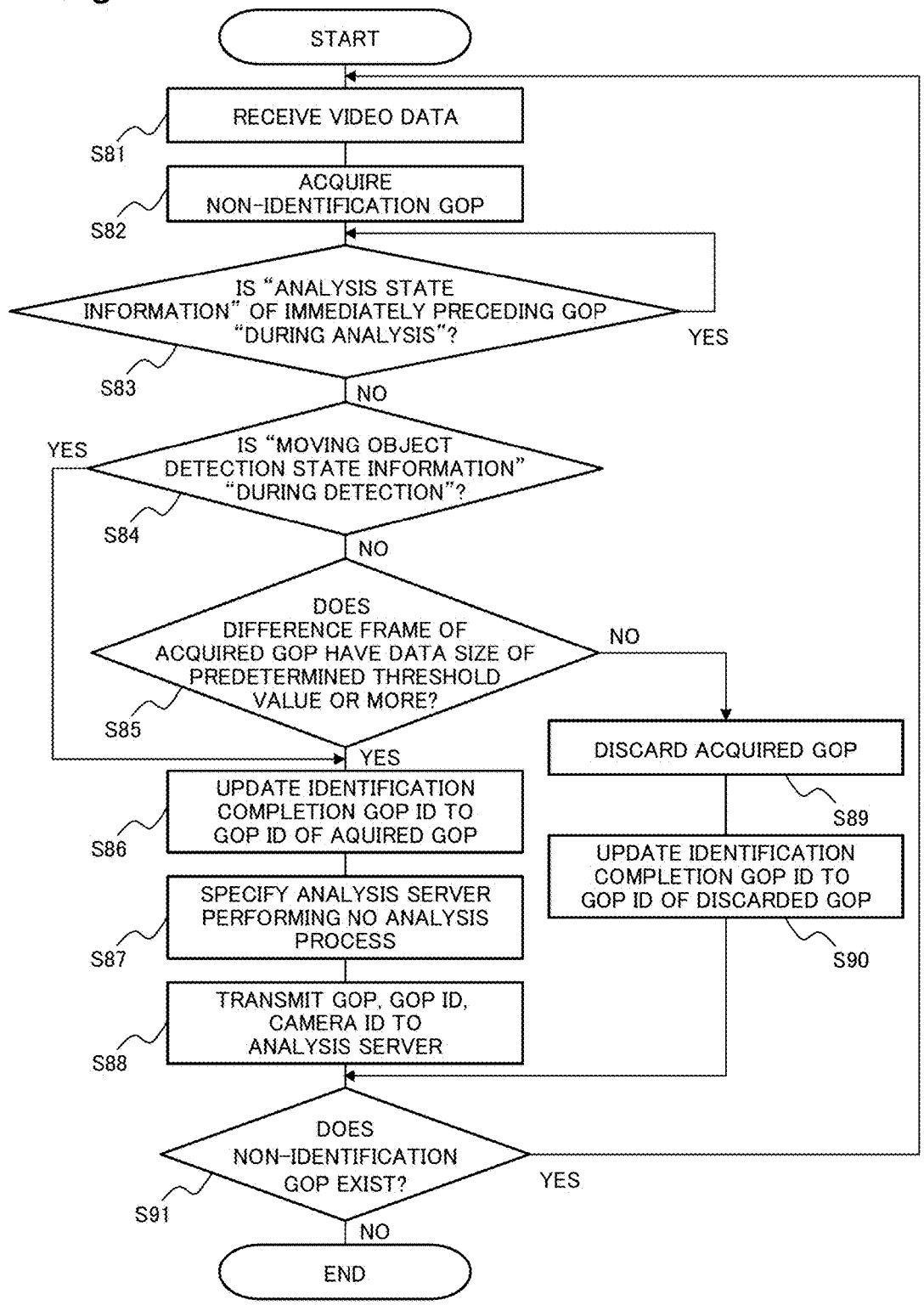
FIG. 8 is a flowchart illustrating an example of the flow of an identification process in an identification server according to the first exemplary embodiment of the present invention.

Next, with reference to FIG. 8, the flow of the identification process performed by the identification server 30 will be described. FIG. 8 is a flowchart illustrating an example of the flow of the identification process in the identification server 30 according to the present exemplary embodiment. As illustrated in FIG. 8, the identification server 30 performs processes of the following steps S81 to S91. In addition, in the following description, a description will be given with reference to FIG. 2, FIG. 6, and FIG. 7.

Step S81: The reception unit 304 receives the video data transmitted from the management server 20 with the camera ID and the GOP ID, and stores the video data in the video data temporal storage unit 301 with the camera ID and the GOP ID.

Step S82: The analysis frame identification unit 302 retrieves the identification completion GOP ID from the video management information storage unit 203 of the management server 20. Then, when frames included in a GOP indicated by the next GOP ID of the retrieved GOP ID are accumulated in the video data temporal storage unit 301, the analysis frame identification unit 302 acquires the GOP from the video data temporal storage unit 301. The acquired GOP is called an identification target GOP.

For example, the identification completion GOP IDs included in the video management information storage unit 203 illustrated in FIG. 6 are "1013" and "540". Therefore, the video management information storage unit 203 acquires these GOP IDs, and when GOPs indicated by "1014" and "541", which are next GOP IDs, are accumulated in the video data temporal storage unit 301, the analysis frame identification unit 302 acquires the GOPs. The GOP IDs of the GOPs acquired by the analysis frame identification unit 302 are the next GOP IDs of the identification completion GOP IDs. Therefore, it can be said that the GOPs are GOPs not subjected to the identification process. Consequently, the identification target GOP is also called non-identification GOP.

In addition, when the reception unit 304 stores the GOP in the video data temporal storage unit 301, the reception unit 304 may also be configured to transmit the GOP ID of the GOP to the analysis frame identification unit 302. As this time, when the GOP indicated by the transmitted GOP ID is accumulated in the video data temporal storage unit 301, the analysis frame identification unit 302 acquires the GOP from the video data temporal storage unit 301. A method in which the analysis frame identification unit 302 acquires the non-identification GOP from the video data temporal storage unit 301 as described above is not specifically limited.

Step S83: The analysis frame identification unit 302 refers to the analysis server management information storage unit 204 of the management server 20, and confirms whether a GOP indicated by a GOP ID immediately preceding to the GOP ID indicating the GOP acquired in step S82 is the during analysis. For example, when the GOP ID of the GOP stored in the video data temporal storage unit 301 is "541", the analysis frame identification unit 302 confirms whether a GOP indicated by "540", which is an immediately preceding GOP ID, is the during analysis. As illustrated in FIG. 7, there is "540" in the column of the GOP ID during analysis. The analysis state information associated with the GOP ID is the "during analysis". Therefore, the analysis frame identification unit 302 confirms that the GOP indicated by the GOP ID is the during analysis. In the case in which the GOP is the during analysis (the case of YES), step S83 is repeated until the GOP is not the during analysis (the GOP ID is not included in the column of the GOP ID during analysis). In the case in which the GOP is not the during analysis (the case of NO), the procedure proceeds to step S84.

Step S84: The analysis frame identification unit 302 refers to the row included in the camera ID which coincides with a camera ID associated with the GOP ID indicating the GOP acquired in step S82. The row is included in the data stored in the video management information storage unit 203. The analysis frame identification unit 302 confirms whether moving object detection state information included in the row is the "during detection". In the case in which the moving object detection state information is the "during detection" (the case of YES), the procedure proceeds to step S86. In the case in which the moving object detection state information is "non-detection" (the case of NO), the procedure proceeds to step S85. Herein, an identification completion GOP ID is included in the row of the camera ID of the data stored in the video management information storage unit 203, which coincides with the camera ID associated with the GOP ID indicating the GOP acquired in step S82. The identification completion GOP ID indicates the GOP immediately preceding to the GOP acquired in step S82. Therefore, it can be said that the analysis frame identification unit 302 confirms moving object detection state information associated with the GOP ID immediately preceding to the GOP ID indicating the GOP acquired in step S82.

Step S85: The analysis frame identification unit 302 confirms whether the difference frame of the GOP acquired in step S82 has a data size of a predetermined threshold value or more. In addition, as described above, the analysis frame identification unit 302 may also be configured to confirm whether any one of the difference frames has the data size of the predetermined threshold value or more, or may also be configured to confirm whether an average value for all the difference frames included in the GOP is the predetermined threshold value or more. In the case in which the difference frame of the acquired GOP has the data size of the predetermined threshold value or more (the case of YES), the procedure proceeds to step S86. In the case in which the acquired GOP does not include the difference frame with the data size of the predetermined threshold value or more (the case of NO), the procedure proceeds to step S89.

Step S86: The analysis frame identification unit 302 transmits an update instruction of the identification completion GOP ID, which is associated with the camera ID, stored in the video management information storage unit 203 to the management server 20. The update instruction is an instruction for updating the identification completion GOP ID to the GOP ID of the GOP acquired in step S82. In this way, the identification completion GOP ID, which is stored in the video management information storage unit 203 and is associated with the camera ID of the monitoring camera 21 captured the identification target GOP, is updated to the GOP ID of the identification target GOP.

Step S87: The analysis frame distribution unit 303 refers to the analysis server management information storage unit 204 of the management server 20, and specifies one or more analysis servers 40 with the analysis state information of "analysis standby".

Step S88: The analysis frame distribution unit 303 transmits the identification target GOP, the GOP ID of the identification target GOP, and the camera ID of the monitoring camera 21 captured the identification target GOP to any one of the analysis servers 40 specified in step S87.

Herein, when the moving object detection state information of a GOP immediately preceding to the identification target GOP is the "during detection", it is not confirmed whether the difference frame of the identification target GOP has the data size of the predetermined threshold value or more. That is, even when the identification target GOP does not include the difference frame with data size of the predetermined threshold value or more, the analysis frame distribution unit 303 transmits the identification target GOP to the analysis servers 40. This is because it is considered that a moving object such as a person included in video data is stationary. Even though the moving object included in the video data, when the moving object is stationary, since difference between pigment information of backward and forward frames is small, there is a case in which the data sizes of difference frames of a GOP is not the predetermined threshold value or more. This will be described with reference to FIG. 9.

Figure 9:
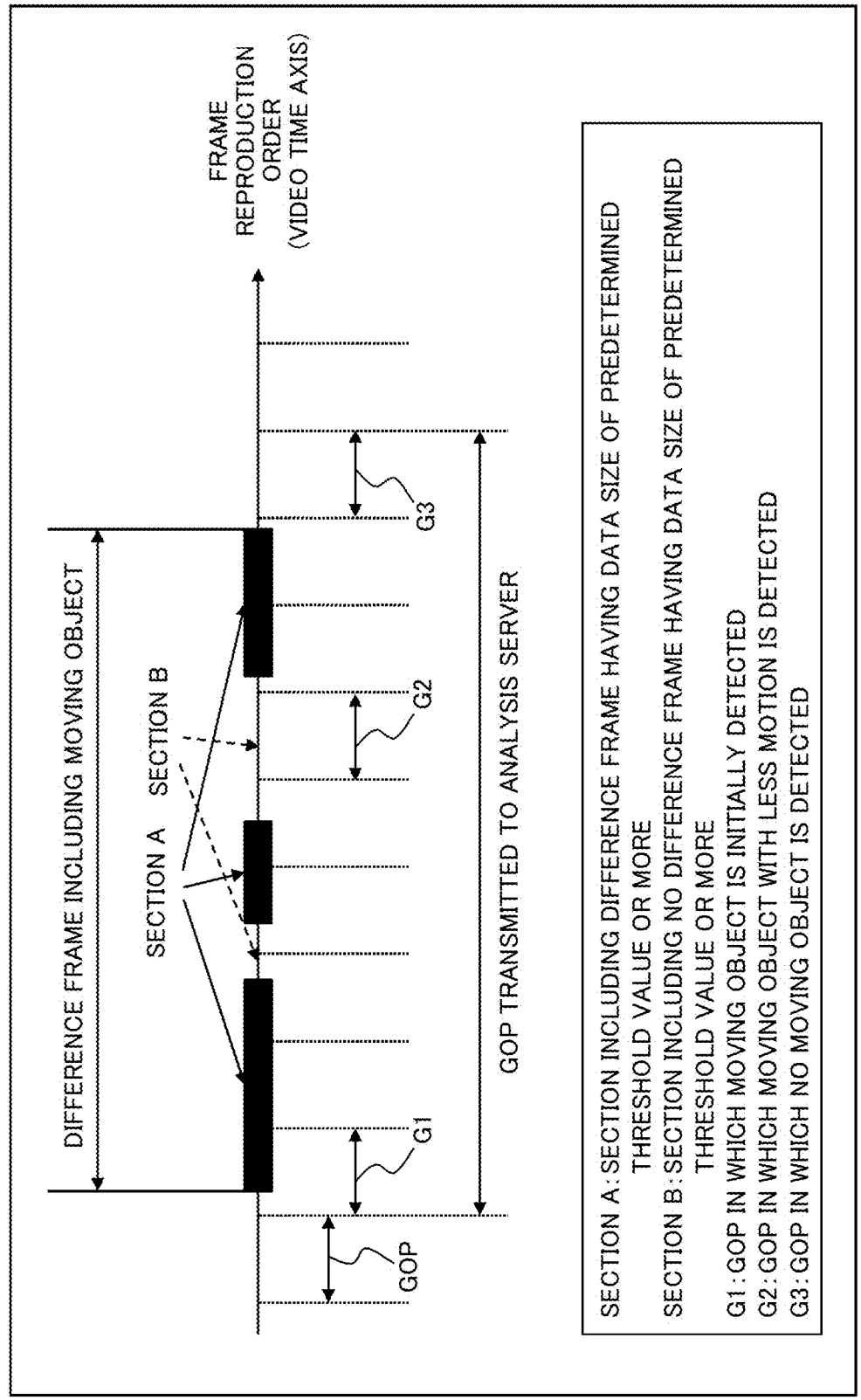
FIG. 9 is a diagram for illustrating a GOP transmitted to an analysis server by an analysis frame distribution unit according to the first exemplary embodiment of the present invention.

FIG. 9 is a diagram for illustrating the GOP transmitted to the analysis servers 40 by the analysis frame distribution unit 303. FIG. 9 illustrates that sections (sections A) including difference frames with data sizes of the predetermined threshold value or more are indicated by black blocks with respect to difference frames arranged in a frame reproduction order (at a video time axis). Furthermore, sections including no difference frames with the data sizes of the predetermined threshold value or more are set as sections B. Furthermore, a zone divided by a dotted line in FIG. 9 indicates one GOP. In addition, it is assumed that all difference frames included in the sections A and the sections B include a moving object.

As illustrated in FIG. 9, among GOPs including the sections A including the difference frames with the data sizes of the predetermined threshold value or more, an initial GOP (G1) is transmitted to the analysis server 40 by the analysis frame distribution unit 303. This GOP is an initial GOP from which a moving object is detected by the analysis server 40. Then, the GOPs including the sections A are transmitted to the analysis server 40 by the analysis frame distribution unit 303.

As illustrated in FIG. 9, G2 is a GOP existing between the GOPs including the sections A, and is a GOP including only the section B. In this G2, a stationary moving object is included, but the difference frame with the data size of the predetermined threshold value or more does not exist. Therefore, when determining the frames size of the difference frames included in this GOP, it is probably determined that the GOP includes frames including no moving object. Herein, since a GOP immediately preceding to the GOP indicated by G2 includes the section A, a moving object is detected by the analysis server 40 in the immediately preceding GOP. Therefore, moving object detection state information for the immediately preceding GOP, which is stored in the video management information storage unit 203, indicates the "during detection". Consequently, the identification server 30 assumes that this GOP (G2) includes a stationary moving object. Then, the analysis frame distribution unit 303 transmits this GOP (G2) to the analysis server 40. In this way, the analysis server 40 can detect that a moving object is included in such a GOP.

By the same reason, the analysis frame distribution unit 303 also transmits a G3, which is a GOP including only the section B, to the analysis server 40, wherein a GOP immediately preceding to the G3 is a GOP including the section A. Herein, each frame of the G3 includes no moving object. Consequently, the analysis server 40 determines that no moving object is included in such a GOP. In this way, the analysis frame distribution unit 303 does not transmit GOPs after the G3 to the analysis server 40.

As described above, the analysis frame distribution unit 303 considers the case in which a moving object such as a person included in vided data is stationary, and transmits a GOP, which may include a moving object, to the analysis server 40. In this way, even though a moving object included in video data is stationary, it is preferably possible to detect the moving object.

After step S88 is ended, the procedure proceeds to step S91.

Step S89: When the acquired GOP does not include the difference frame with data size of the predetermined threshold value or more (the case of NO in step S85), the analysis frame identification unit 302 discards the GOP.

Step S90: The analysis frame identification unit 302 transmits, to the management server 20, an update instruction for updating the identification completion GOP ID, which is associated with the camera ID and is stored in the video management information storage unit 203, to the GOP ID of the GOP discarded in step S89. In this way, the identification completion GOP ID, which is stored in the video management information storage unit 203 and is associated with the camera ID of the monitoring camera 21 captured the identification target GOP, is updated to the GOP ID of the GOP confirmed in step S85 that there are no frames with the data sizes of the predetermined threshold value or more.

In addition, step S89 and step S90 may also be simultaneously performed, or may also be performed in a reverse order.

Step S91: After step S88 is ended or after step S90 is ended, the analysis frame distribution unit 303 confirms whether the non-identification GOP exists in the video data temporal storage unit 301. In detail, the analysis frame distribution unit 303 acquires the identification completion GOP ID from the video management information storage unit 203 of the management server 20, and confirms whether a GOP indicated by the next GOP ID of the acquired GOP ID exists in the video data temporal storage unit 301. In addition, the analysis frame distribution unit 303 may also be configured to confirm whether there is the non-identification GOP in the video data temporal storage unit 301 by using the identification completion GOP ID updated in step S86 or step S90. In the case in which the non-identification GOP exists in the video data temporal storage unit 301 (the case of YES), the procedure of the identification server 30 returns to step S81. In the case in which the non-identification GOP does not exist in the video data temporal storage unit 301 (the case of NO), the identification server 30 ends the identification process.

In addition, even after the identification process is ended, when video data is received from the management server 20, the reception unit 304 stores the video data in the video data temporal storage unit 301 (step S81). Then, when GOPs are accumulated in the video data temporal storage unit 301, the analysis frame identification unit 302 acquires an identification target GOP from the video data temporal storage unit 301 (step S82), and performs the processes after step S83.

As described above, by the identification process, the identification server 30 selects a GOP which may include a moving object, and transmits the GOP to the analysis server 40.

(Flow of Analysis Process)

Figure 10:
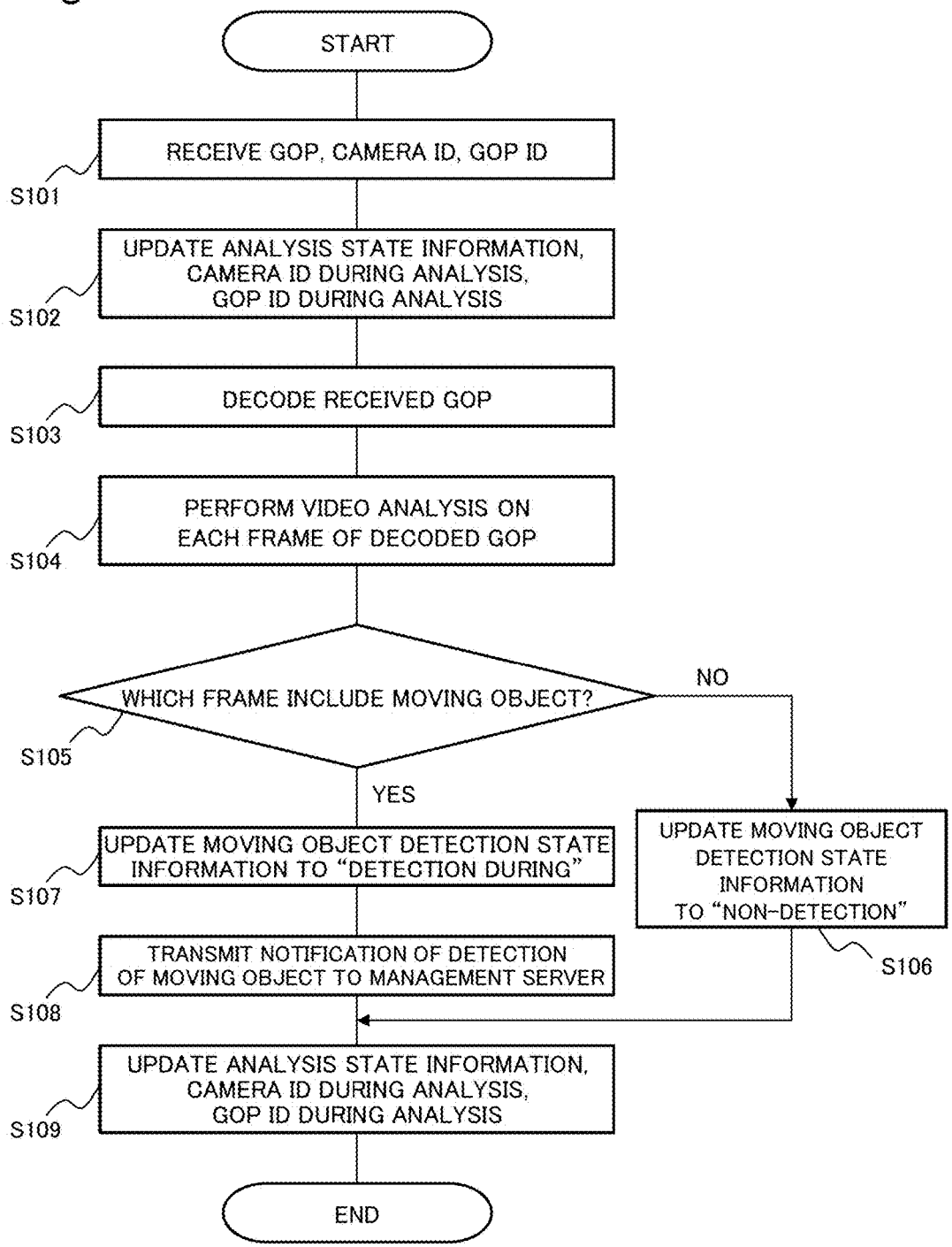
FIG. 10 is a flowchart illustrating an example of the flow of an analysis process in the analysis server according to the first exemplary embodiment of the present invention.

Next, with reference to FIG. 10, the flow of the analysis process performed by the analysis server 40 will be described. FIG. 10 is a flowchart illustrating an example of the flow of the analysis process in the analysis server 40 according to the present exemplary embodiment. As illustrated in FIG. 10, the analysis server 40 performs processes of the following steps S101 to S109.

Step S101: The decoding unit 401 receives the GOP, the GOP ID, and the camera ID transmitted from the identification server 30.

Step S102: The decoding unit 401 transmits an update instruction for updating analysis state information, a camera ID during analysis, and a GOP ID during analysis, which are associated with an analysis server ID indicating its own analysis server 40 and are stored in the analysis server management information storage unit 204, to the management server 20. Specifically, the decoding unit 401 transmits instructions of following (1) to (3) for the analysis server management information storage unit 204 of the management server 20.

(1) an instruction for updating the analysis state information associated with the analysis server ID indicating its own analysis server 40 to the "during analysis", (2) an instruction for updating the camera ID during analysis associated with the analysis server ID to the camera ID received in step S101, and (3) an instruction for updating the GOP ID during analysis associated with the analysis server ID to the GOP ID received in step S101.

In this way, analysis state information stored in the analysis server management information storage unit 204 and associated with the analysis server ID indicating the analysis server 40 performing the GOP analysis process is updated to information representing that analysis is performed in the analysis server 40. Furthermore, the camera ID associated with the analysis server ID stored in the analysis server management information storage unit 204 is updated to information representing a monitoring camera 21 captured the received GOP. Moreover, the GOP ID associated with the analysis server ID stored in the analysis server management information storage unit 204 is updated to information representing the received GOP.

Step S103: The decoding unit 401 performs a decoding process on the GOP received in step S101.

Step S104: The analysis unit 402 performs video analysis (image analysis) on each frame of the decoded GOP.

Step S105: The analysis unit 402 confirms whether a moving object is included in at least one frame of the GOP subjected to the video analysis. When the moving object is included (in the case of YES), the procedure proceeds to step S107. When the moving object is not included (in the case of NO), the procedure proceeds to step S106.

Step S106: When the moving object is not included in all the frames of the GOP subjected to the video analysis, the analysis unit 402 determines that the moving object is not detected in the GOP. Then, the analysis unit 402 transmits, to the management server 20, an update instruction for updating moving object detection state information, which is associated with the camera ID received in the decoding unit 401 in step S101 and is stored in the video management information storage unit 203, to the "non-detection". In this way, the moving object detection state information, which is stored in the video management information storage unit 203 and is associated with the camera ID of the monitoring camera 21 captured the GOP, is updated to information representing that the moving object has not been detected. Then, the procedure proceeds to step S109.

Step S107: When the moving object is included in at least one frame of the GOP subjected to the video analysis, the analysis unit 402 transmits, to the management server 20, an update instruction for updating the moving object detection state information, which is associated with the camera ID received in the decoding unit 401 in step S101 and is stored in the video management information storage unit 203, to the "during detection". In this way, the moving object detection state information, which is stored in the video management information storage unit 203 and is associated with the camera ID of the monitoring camera 21 captured the GOP, is updated to information representing that the moving object has been detected.

Step S108: The analysis unit 402 transmits notification indicating that the moving object has been detected to the management server 20. In detail, the analysis unit 402 transmits the GOP ID of the GOP in which the moving object has been detected and the camera ID indicating the monitoring camera 21 captured the GOP to the management server 20.

In addition, step S107 and step S108 may also be simultaneously performed.

Step S109: After step S106 or step S108 is ended, the analysis unit 402 transmits the update instruction for updating the analysis state information, the camera ID during analysis, and the GOP ID during analysis, which are associated with the analysis server ID indicating its own analysis server 40 and are stored in the analysis server management information storage unit 204, to the management server 20, and ends the analysis process. Specifically, the analysis unit 402 transmits instructions of following (1) and (2) for the analysis server management information storage unit 204 of the management server 20.

(1) an instruction for updating the analysis state information associated with the analysis server ID indicating its own analysis server 40 to the "during standby", and (2) an instruction for updating the camera ID during analysis and the GOP ID during analysis associated with the analysis server ID to be empty ("-" in FIG. 7).

In this way, the analysis state information stored in the analysis server management information storage unit 204 and associated with the analysis server ID indicating the analysis server 40 performing the GOP analysis process is updated to information representing that no analysis is performed in the analysis server 40. Furthermore, the camera ID and the GOP ID stored in the analysis server management information storage unit 204 and associated with the analysis server ID are updated to information representing that they do not indicate any value.

After the identification process and the analysis process are ended, the alert notification unit 202 of the management server 20 receives the camera ID and the GOP ID transmitted from the analysis server 40. Then, the alert notification unit 202 refers to the time information storage unit 201, and acquires a camera capturing time associated with the received camera ID and GOP ID. Then, the alert notification unit 202 transmits an instruction for displaying an alert to the monitoring terminal 50 with the camera ID and the acquired camera capturing time.

When the alert reception unit 502 of the monitoring terminal 50 receives the instruction for displaying the alert from the management server 20 together with the camera ID and the camera capturing time, the alert reception unit 502 displays the camera capturing time on the display unit 501 as the alert. In this way, it is possible to provide an administrator performing monitoring with information representing date and time at which a moving object has been detected.

Since a camera ID is provided to the administrator and thus the GOP of video data in which the moving object has been detected can be specified using the camera ID and the camera capturing time. Therefore, when video data at this time is preserved, the preserved data can also be easily reproduced.

(Conclusion)

In a large scale monitoring system that analyzes video data from a plurality of network camera to detect a moving object such as a person or a vehicle, and automatically alerts an administrator, a method for decoding all sections of compressed-coded video data and then performing a video analysis process is employed. Therefore, in such a large scale monitoring system, since the throughput at the time of decoding and at the time of video analysis is large, a lot of CPU power is necessary.

Therefore, in order to analyze a plurality of camera videos in realtime and detect a moving object, a great deal of analysis servers are necessary, so that much costs such as server introduction costs, running costs, or server management costs are required.

For example, a video of a network camera capturing an unfrequented place has less motion. Therefore, in difference frames of video data compression-coded by a video data compression standard such as an MPEG-4 or an MPEG-2, a data size (a data quantity) of a difference frame of a time period in which there has been a motion tends to be large.

In the technology disclosed in Japanese Laid-open Patent Publication No. 2013-125304, since the overall system throughput is not reduced, many analysis servers are necessary, so that costs are required.

However, according to the monitoring system 100 according to the present exemplary embodiment, it is possible to more preferably reduce costs.

This is because the analysis frame identification unit 302 identifies whether each GOP of video data to be analyzed includes a difference frame with a data size of a predetermined threshold value or more. Furthermore, this is because the decoding unit 401 of the analysis server 40 decodes a plurality of frames included in a GOP identified by the analysis frame identification unit 302 to include the difference frame with the data size of the predetermined threshold value or more, and the analysis unit 402 performs image analysis on each decoded frame to detect a moving object.

In this way, the analysis frame identification unit 302 selects a group (GOP) to be subjected to image analysis in the state of decoded video data. As described above, it is probable that the difference frame with the data size of the predetermined threshold value or more includes a moving object. Since the analysis frame identification unit 302 uses a data size of each frame acquirable in the decoded state when selecting a GOP which may include a moving object, it is possible to select the GOP with a smaller throughput at a high speed.

Furthermore, since the GOP selected by the analysis frame identification unit 302 is transmitted to the analysis servers 40, the analysis servers 40 do not always analyze the video data received in the management server 20. Thus, as compared with the case of analyzing all GOPs of vided data, the monitoring system 100 according to the present exemplary embodiment can preferably perform image analysis by using a smaller number of analysis servers 40, and detect a moving object included in video data.

Furthermore, since it is possible to process in a distributed manner in units of GOPs, a parallel process of the identification process and/or the analysis process is easily performed. Furthermore, when these processes are distributed and performed, it is possible to distribute the entire load and to shorten the entire processing time of the monitoring system 100.

Furthermore, the identification server 30 does not transmit a GOP including no difference frames with the data sizes of the predetermined threshold value or more to the analysis servers 40. Consequently, an I-frame included in such a GOP is not transmitted to the analysis servers 40. In this way, for example, as compared with the technique and the like of transmitting only the I-frame to the analysis servers 40, it is possible to further reduce a throughput.

As described above it is possible to reduce throughput applied on the analysis servers 40, it is possible to reduce the number of the analysis servers 40 in the monitoring system 100 that analyzes a plurality of camera videos in realtime. Thus, in accordance with the monitoring system 100 according to the present exemplary embodiment, it is possible to preferably reduce server introduction costs, running costs, server management costs and the like.

Furthermore, since the identification server 30 transmits the selected GOP to the analysis servers 40, it is possible to reduce the band of a network used between the identification server 30 and the analysis servers 40.

Furthermore, since the throughput of the analysis frame identification unit 302 and the throughput of the analysis frame distribution unit 303 are small, they can be allowed to perform processing in the same server in a parallel manner. When the parallel processing is performed, it is possible to process a plurality of pieces of camera video data in a parallel manner. Consequently, it is possible to further shorten an identification processing time for an analysis target video.

Second Exemplary Embodiment

Next, a second exemplary embodiment of the present invention will be described in detail with reference to the accompanying drawings. For the purpose of convenience, the same reference numerals are used to designate members having the same functions as those of the members included in the drawings described in the aforementioned first exemplary embodiment, and a detailed description thereof will be omitted. A configuration of a monitoring system 100 according to the present exemplary embodiment is same the configuration of the monitoring system 100 according to the first exemplary embodiment illustrated in FIG. 3.

Figure 11:
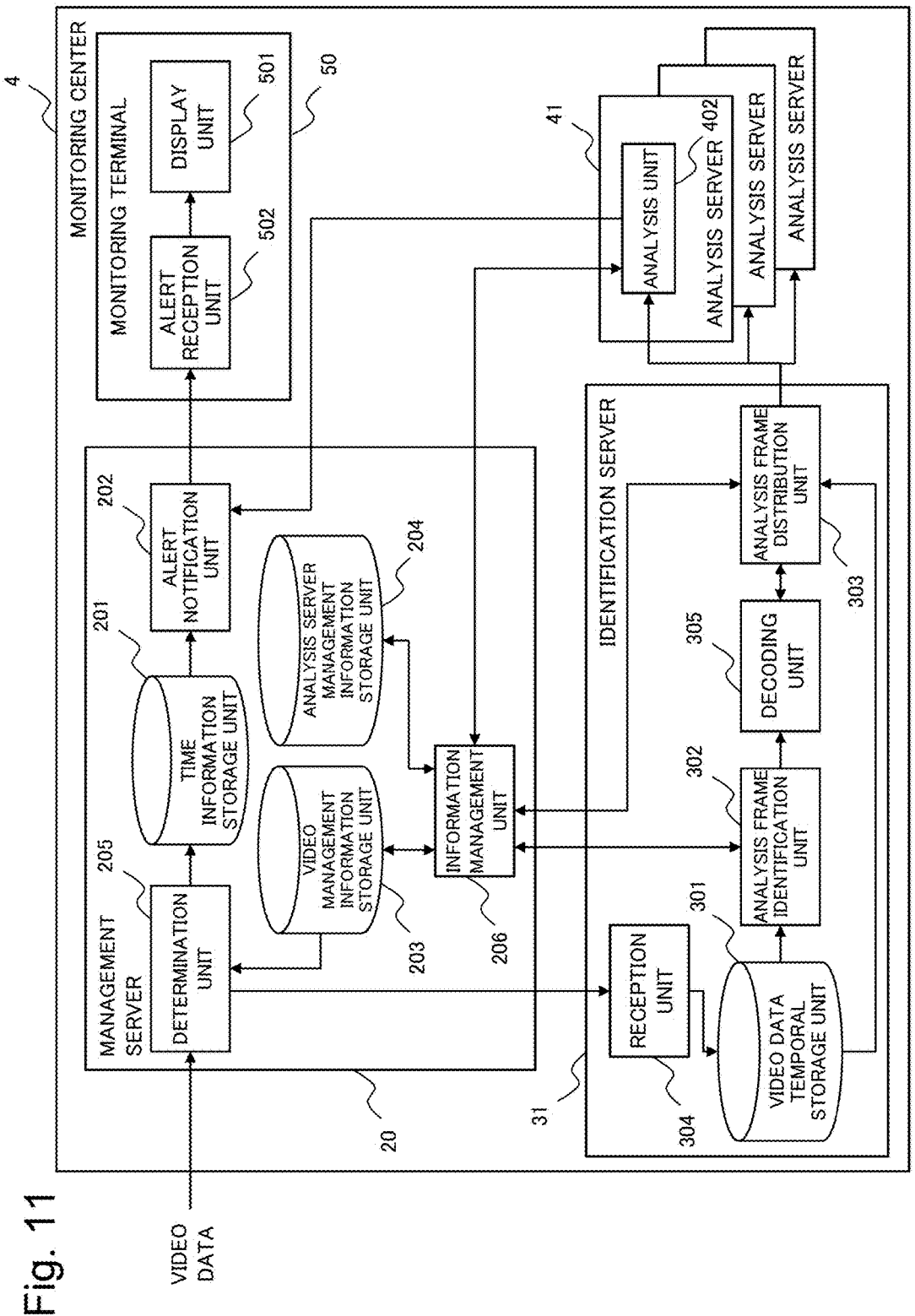
FIG. 11 is a functional block diagram illustrating an example of a functional configuration of a monitoring center in a monitoring system according to a second exemplary embodiment of the present invention.

FIG. 11 is a functional block diagram illustrating an example of a functional configuration of a monitoring center 4 according to the second exemplary embodiment of the present invention. The monitoring center 4 receives video data from a plurality of monitoring cameras 21 similarly to the monitoring center 1 according to the first exemplary embodiment.

The monitoring center 4 according to the present exemplary embodiment is different from the monitoring center 1 according to the first exemplary embodiment in that a decoding unit is provided in an identification server other than an analysis server. As illustrated in FIG. 11, the monitoring center 4 includes a management server 20, an identification server 31, one or a plurality of analysis servers 41, and a monitoring terminal 50.

The identification server 31 includes a video data temporal storage unit 301, an analysis frame identification unit 302, an analysis frame distribution unit 303, a reception unit 304, and a decoding unit 305. Furthermore, each analysis server 41 includes an analysis unit 402.

The analysis frame identification unit 302 has the same functions as those of the analysis frame identification unit 302 in the first exemplary embodiment. The analysis frame identification unit 302 transmits a GOP selected as a GOP which may include a moving object to the decoding unit 305. Furthermore, the analysis frame identification unit 302 transmits information for specifying a difference frame with a data size of a predetermined threshold value or more to the decoding unit 305.

The decoding unit 305 performs a decoding process on the difference frame with the data size of the predetermined threshold value or more in the GOP which may include the moving object. The decoding unit 305 transmits the decoded difference frame to the analysis frame distribution unit 303.

The analysis frame distribution unit 303 has the same functions as those of the analysis frame distribution unit 303 in the first exemplary embodiment. The analysis frame distribution unit 303 transmits, to analysis servers 41 performing no analysis process, the decoded difference frame with the data size of the predetermined threshold value or more in the GOPs which may include the moving object, with a GOP ID of the GOP including the difference frame and a camera ID.

Then, the analysis unit 402 of the analysis server 41 performs video analysis (image analysis) on the difference frame transmitted from the analysis frame distribution unit 303. In this way, the analysis unit 402 confirms whether the moving object is included in the frame.

At this time, the analysis unit 402 performs the update instruction (step S102) for the analysis server management information storage unit 204, which is performed by the decoding unit 401 in the first exemplary embodiment, before performing the video analysis.

According to the present exemplary embodiment, for example, video data, in which an I-frame interval is very large, is sequentially decoded in the identification server 31. Then, the identification server 31 transmits the difference frame with the data size of the predetermined threshold value or more to the analysis servers 41.

In this way, it is possible to reduce the band of a network used between the identification server 31 and the analysis servers 41.

In addition, similarly to the aforementioned first exemplary embodiment, when the moving object detection state information for the GOP ID immediately preceding to the analysis target GOP is the "during detection", the analysis frame distribution unit 303 may also be configured to transmit the GOP to the analysis servers 41. At this time, the analysis frame distribution unit 303 instructs the decoding unit 305 to perform a decoding process on the GOP. Then, the analysis frame distribution unit 303 transmits the decoded GOP to any one of specified analysis servers 41 with a GOP ID and a camera ID.

In this way, similarly to the first exemplary embodiment, the identification server 31 can more preferably transmit a GOP which may include the moving object to the analysis servers 41.

Third Exemplary Embodiment

Next, a third exemplary embodiment of the present invention will be described in detail with reference to the accompanying drawings. For the purpose of convenience, the same reference numerals are used to designate members having the same functions as those of the members included in the drawings described in the aforementioned first and second exemplary embodiments, and a detailed description thereof will be omitted. A configuration of a monitoring system 100 according to the present exemplary embodiment is same the configuration of the monitoring system 100 according to the first exemplary embodiment illustrated in FIG. 3.

Figure 12:
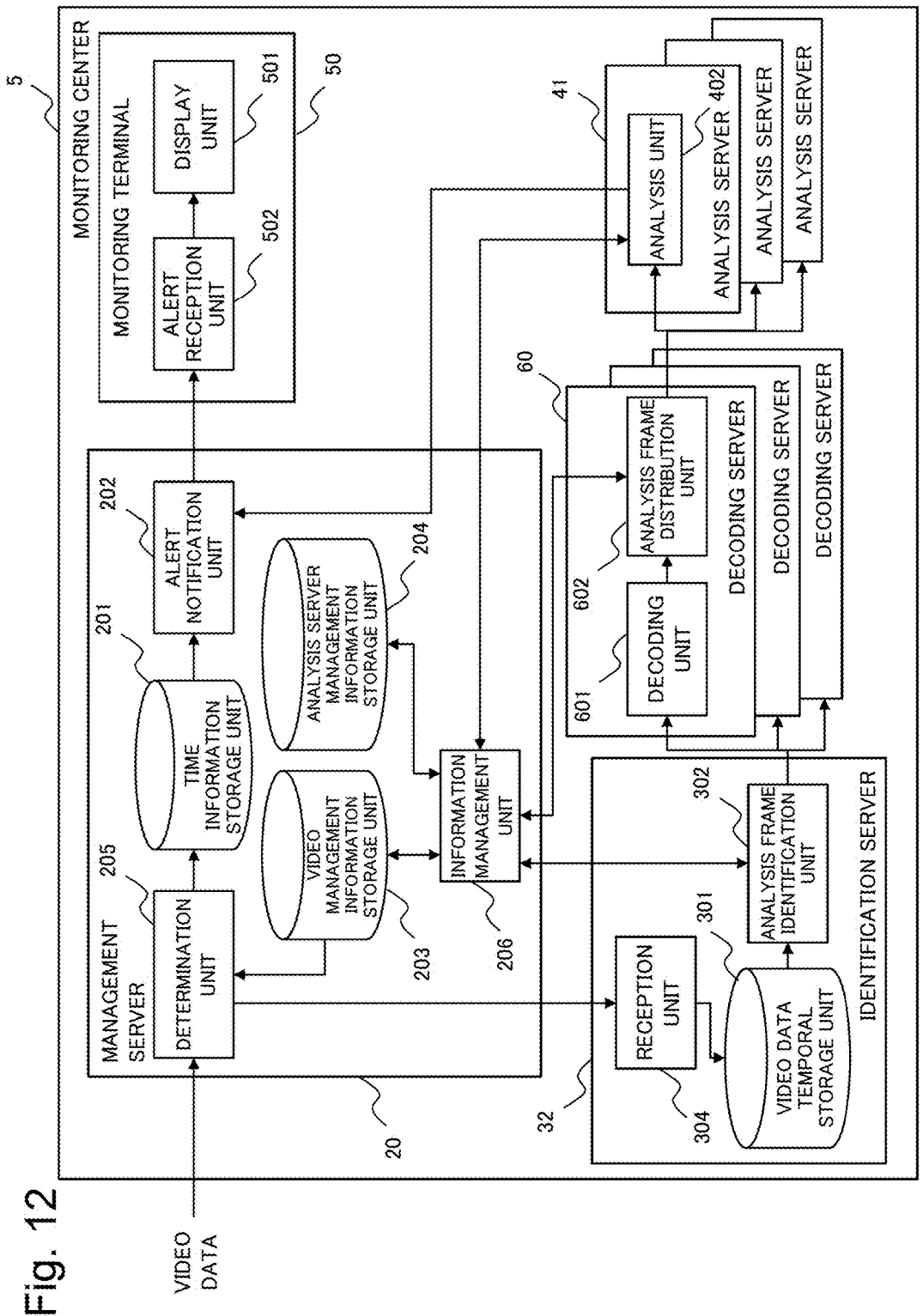
FIG. 12 is a functional block diagram illustrating an example of a functional configuration of a monitoring center in a monitoring system according to a third exemplary embodiment of the present invention.

FIG. 12 is a functional configuration diagram illustrating an example of a functional configuration of a monitoring center 5 according to the third exemplary embodiment of the present invention.

The monitoring center 5 according to the present exemplary embodiment is different from the monitoring center 4 according to the second exemplary embodiment in that a server for performing a decoding process is separately provided. As illustrated in FIG. 12, the monitoring center 5 includes a management server 20, an identification server 32, one or a plurality of analysis servers 41, a monitoring terminal 50, and one or a plurality of decoding servers 60. Each decoding server 60 includes a decoding unit 601 and an analysis frame distribution unit 602. The decoding unit 601 corresponds to the decoding unit 305 in the second exemplary embodiment, and the analysis frame distribution unit 602 corresponds to the analysis frame distribution unit 303 in the second exemplary embodiment.

The identification server 32 includes a video data temporal storage unit 301, an analysis frame identification unit 302, and a reception unit 304. The analysis frame identification unit 302 transmits, to any one of the plurality of decoding servers 60, a GOP selected as a GOP which may include a moving object. Herein, a method for specifying decoding servers 60 to which the GOP is transmitted from the analysis frame identification unit 302 may also be the same method as that in which the analysis frame distribution unit 303 specifies the decoding servers 40. That is, it may be possible to employ a configuration in which the management server 20 manages the states of the decoding servers 60, and the analysis frame identification unit 302 refers to the managed information, thereby specifying decoding servers 60 performing no decoding process.

As described above, the decoding unit 601 is disposed in a server different from the identification server 32, so that it is possible to distribute a load in a decoding process and to increase the speed of the decoding process.

Fourth Exemplary Embodiment

Next, a fourth exemplary embodiment of the present invention will be described in detail with reference to the accompanying drawings. In the aforementioned first to third exemplary embodiments, the case in which each server included in the monitoring center has a separate configuration has been described. However, a plurality of servers included in the monitoring center may also be implemented in one apparatus. In the present exemplary embodiment, the case in which the respective servers of the monitoring center are implemented in one apparatus will be described.

Figure 13:
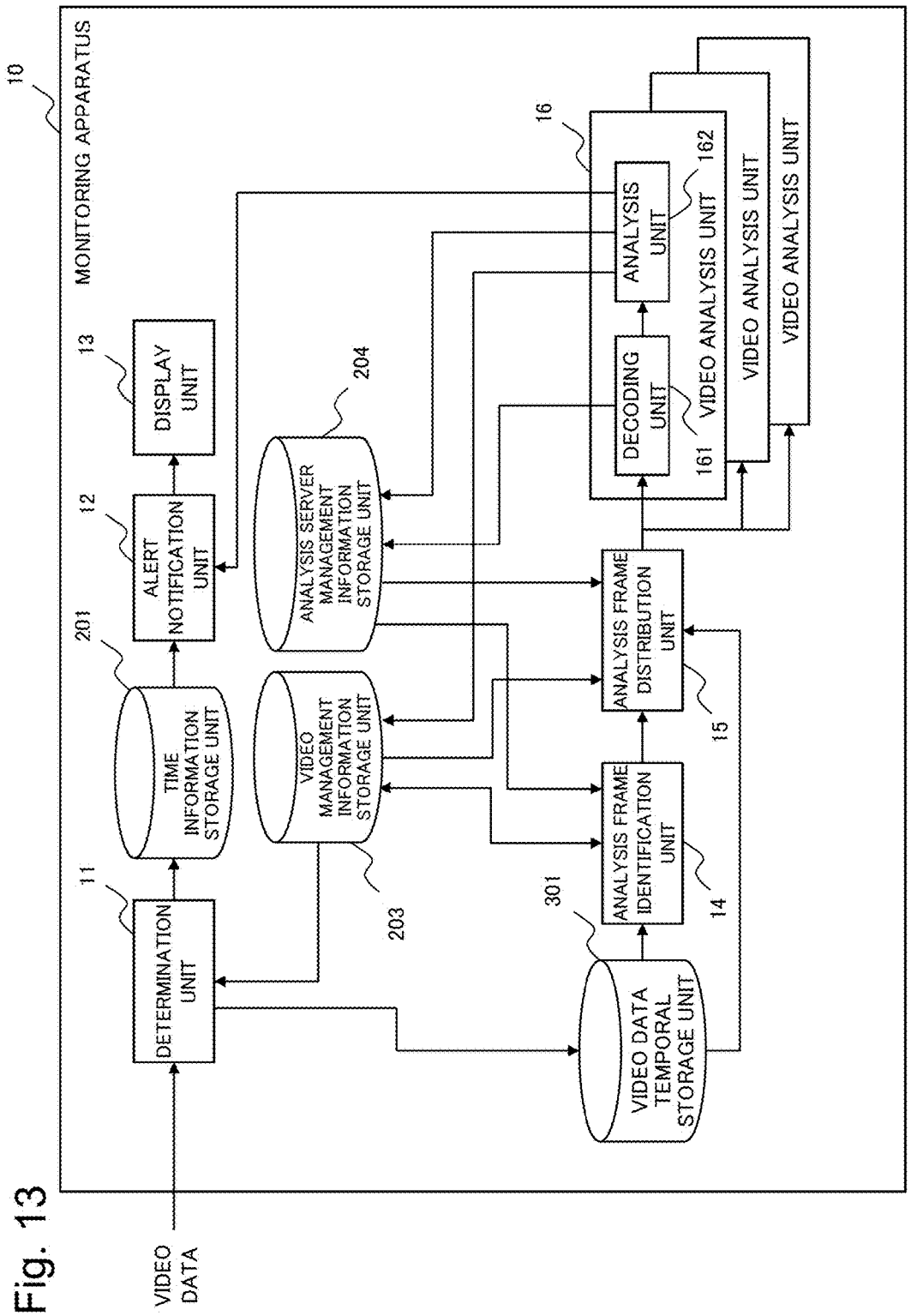
FIG. 13 is a functional block diagram illustrating an example of a functional configuration of a monitoring apparatus according to a fourth exemplary embodiment of the present invention.

FIG. 13 is a diagram illustrating an example of a functional configuration of a monitoring apparatus 10 according to the fourth exemplary embodiment of the present invention. For the purpose of convenience, the same reference numerals are used to designate members having the same functions as those of the members included in the drawings described in the aforementioned first exemplary embodiment, and a detailed description thereof will be omitted. Furthermore, the configuration of the monitoring apparatus 10 illustrated in FIG. 13 indicates the case in which the monitoring center 1 according to the first exemplary embodiment is implemented in one apparatus, but the monitoring center 4 according to the second exemplary embodiment and the monitoring center 5 according to the third exemplary embodiment can also be implemented in one apparatus, similarly to the present exemplary embodiment.

As illustrated in FIG. 13, the monitoring apparatus 10 includes a determination unit 11, an alert notification unit 12, a display unit 13, an analysis frame identification unit 14, an analysis frame distribution unit 15, one or a plurality of video analysis units 16, a time information storage unit 201, a video management information storage unit 203, an analysis server management information storage unit 204, and a video data temporal storage unit 301.

In addition, in the present exemplary embodiment, it is assumed that instead of an analysis server ID stored in the analysis server management information storage unit 204, a video analysis unit ID for specifying any one of the plurality of video analysis units 16 is included.

The determination unit 11 corresponds to the aforementioned determination unit 205. The determination unit 11 receives video data in a state compressed by an MPEG standard, which is transmitted from a monitored base 2, via a network 3. When the video data is received, the determination unit 11 refers to analysis target information, which is associated with a camera ID indicating a monitoring camera 21 captured the video data and stored in the video management information storage unit 203, and determines whether the video data is an analysis target.

Furthermore, the determination unit 11 assigns a GOP ID to each GOP of the received video data. Then, when the received video data is the analysis target, the determination unit 11 associates the video data with the camera ID and the GOP ID, and stores an association result in the video data temporal storage unit 301.

Furthermore, for each GOP, the determination unit 11 associates a camera ID indicating a monitoring camera 21 captured a frame (image data) included in the GOP, a GOP ID indicating the GOP, and a time (a camera capturing time) at which the frame included in the GOP has been captured with one another, and stores an association result in the time information storage unit 201.

The alert notification unit 12 corresponds to the aforementioned alert notification unit 202. The alert notification unit 12 refers to the time information storage unit 201, and acquires camera capturing time at which the camera ID and the GOP ID transmitted from the video analysis unit 16 coincide with the camera ID and the GOP ID stored in the time information storage unit 201, respectively. In this way, the alert notification unit 12 can acquire an actual time at which a monitoring camera 21 detected a moving object has captured a video. Then, the alert notification unit 12 instructs the display unit 13 to display an alert.

The display unit 13 corresponds to the aforementioned display unit 501. The display unit 13 displays the alert according to the instruction from the alert notification unit 12.

The analysis frame identification unit 14 corresponds to the aforementioned analysis frame identification unit 302. Furthermore, the analysis frame distribution unit 15 corresponds to the aforementioned analysis frame distribution unit 303. The functions of the analysis frame identification unit 14 and the analysis frame distribution unit 15 will be described in detail with reference to the flowchart of FIG. 8.

As illustrated in FIG. 8, when the determination unit 11 receives video data from the monitoring camera 21, the determination unit 11 stores the video data in the video data temporal storage unit 301 with the camera ID and the GOP ID (step S81).

The analysis frame identification unit 14 refers to the video management information storage unit 203 and retrieves an identification completion GOP ID. Then, when frames included in a GOP indicated by the next GOP ID of the retrieved GOP ID are accumulated in the video data temporal storage unit 301, the analysis frame identification unit 14 acquires the GOP (a non-identification GOP) from the video data temporal storage unit 301 (step S82).

The analysis frame identification unit 14 refers to the analysis server management information storage unit 204, and confirms whether a GOP indicated by a GOP ID immediately preceding to the GOP ID indicating the GOP acquired in step S82 is the during analysis (step S83). In the case in which the GOP is during analysis (YES in step S83), step S83 is repeated until the GOP is not during analysis (the GOP ID is not included in a GOP ID during analysis). In the case in which the GOP is not the during analysis (NO in step S83), the analysis frame identification unit 14 refers to the video management information storage unit 203, and confirms whether moving object detection state information associated with the camera ID which coincides with a camera ID associated with the GOP ID indicating the GOP acquired in step S82 is the "during detection" (step S84).

In the case in which the moving object detection state information is the "non-detection" (NO in step S84), the analysis frame identification unit 14 confirms whether the difference frame of the GOP acquired in step S82 has a data size of a predetermined threshold value or more (step S85). In addition, similarly to the aforementioned analysis frame identification unit 302, the analysis frame identification unit 14 may also be configured to confirm whether any one of the difference frames has the data size of the predetermined threshold value or more, or may also be configured to confirm whether an average value for all the difference frames included in the GOP is the predetermined threshold value or more.

In the case in which the difference frame of the acquired GOP has the data size of the predetermined threshold value or more (YES in step S85) or in the case in which the moving object detection state information is the "during detection" (YES in step S84), the analysis frame identification unit 14 updates the identification completion GOP ID associated with the camera ID stored in the video management information storage unit 203 to the GOP ID of the GOP acquired in step S82 (step S86).

Then, the analysis frame distribution unit 15 refers to the analysis server management information storage unit 204, and specifies analysis servers 16 with the analysis state information of "analysis standby" (step S87).

Then, the analysis frame distribution unit 15 transmits an identification target GOP, the GOP ID of the identification target GOP, and the camera ID of the monitoring camera 21 captured the identification target GOP to any one of the specified analysis servers 16 (step S88).

In the case in which the acquired GOP does not include the difference frame with the data size of the predetermined threshold value or more (NO in step S85), the analysis frame identification unit 14 discards the GOP (step S89). Then, the analysis frame identification unit 14 updates the identification completion GOP ID associated with the camera ID stored in the video management information storage unit 203 to the GOP ID of the GOP discarded in step S89 (step S90).

In addition, step S89 and step S90 may also be simultaneously performed, or may also be performed in a reverse order.

After step S88 is ended or after step S90 is ended, the analysis frame distribution unit 15 confirms whether the non-identification GOP exists in the video data temporal storage unit 301. In detail, the analysis frame distribution unit 15 acquires the identification completion GOP ID from the video management information storage unit 203, and confirms whether a GOP indicated by the next GOP ID of the acquired GOP ID exists in the video data temporal storage unit 301 (step S91). In addition, the analysis frame distribution unit 15 may also be configured to confirm whether there is the non-identification GOP in the video data temporal storage unit 301 by using the identification completion GOP ID updated in step S86 or step S90.

In the case in which the non-identification GOP exists in the video data temporal storage unit 301 (YES in step S91), the procedure returns to step S81. In the case in which the non-identification GOP does not exist in the video data temporal storage unit 301 (NO in step S91), the monitoring apparatus 10 ends the identification process.

As described above, by the identification process, the monitoring apparatus 10 selects a GOP which may include a moving object, and transmits the GOP to any one of the video analysis units 16.

The video analysis units 16 correspond to the aforementioned analysis servers 40. In addition, in the present exemplary embodiment, the case in which the number of the video analysis units 16 is three as illustrated in FIG. 13 has been described; however, the present invention is not limited thereto. Furthermore, the video analysis units 16 have the same function. In addition, in the present exemplary embodiment, the video analysis units will be collectively called the video analysis unit 16.

Each video analysis unit 16 includes a decoding unit 161 and an analysis unit 162. The decoding unit 161 and the analysis unit 162 correspond to the decoding unit 401 and the analysis unit 402, respectively. An analysis process of the video analysis unit 16 will be described with reference to the flowchart of FIG. 10.

As illustrated in FIG. 10, the decoding unit 161 of the video analysis unit 16 receives the GOP, the GOP ID, and the camera ID from the analysis frame distribution unit 15 (step S101), and updates analysis state information, a camera ID during analysis, and a GOP ID during analysis, which are associated with a video analysis unit ID indicating its own video analysis unit 16 and are stored in the analysis server management information storage unit 204. In detail, with respect to the analysis server management information storage unit 204, the decoding unit 161 updates the analysis state information associated with the video analysis unit ID indicating its own video analysis unit 16 to the "during analysis" (1), updates the camera ID during analysis associated with the video analysis unit ID to the camera ID received in step S101 (2), and updates the GOP ID during analysis associated with the video analysis unit ID to the GOP ID received in step S101 (3) (step S102).

Then, the decoding unit 161 performs a decoding process on the GOP received in step S101 (step S103). Then, the analysis unit 162 performs video analysis (image analysis) on each frame of the decoded GOP (step S104).

Then, the analysis unit 162 confirms whether a moving object is included in at least one frame of the GOP subjected to the video analysis (step S105). When the moving object is not included (NO in step S105), the analysis unit 162 determines that the moving object is not detected in the GOP. Then, the analysis unit 162 updates the moving object detection state information, which is associated with the camera ID received in the decoding unit 161 in step S101 and is stored in the video management information storage unit 203, to the "non-detection" (step S106).

When the moving object is included (YES in step S105), the analysis unit 162 updates the moving object detection state information, which is associated with the camera ID received in the decoding unit 161 in step S101 and is stored in the video management information storage unit 203, to the "during detection" (step S107).

After step S107 is ended, the analysis unit 162 transmits notification indicating that the moving object has been detected to the alert notification unit 12. In detail, the analysis unit 162 transmits the GOP ID of the GOP in which the moving object has been detected and the camera ID of the monitoring camera 21 captured the GOP to the alert notification unit 12 (step S108). In addition, step S107 and step S108 may also be simultaneously performed.

After step S106 or step S108 is ended, the analysis unit 162 updates the analysis state information, the camera ID during analysis, and the GOP ID during analysis, which are associated with the video analysis unit ID indicating its own video analysis unit 16 and are stored in the analysis server management information storage unit 204, and ends the analysis process. In detail, with respect to the analysis server management information storage unit 204, the analysis unit 162 updates the analysis state information associated with the video analysis unit ID indicating its own video analysis unit 16 to the "during standby", and updates the camera ID during analysis and the GOP ID during analysis associated with the video analysis unit ID to be empty ("-" in FIG. 7) (step S109).

After the identification process and the analysis process are ended, the alert notification unit 12 receives the camera ID and the GOP ID from the analysis unit 16, refers to the time information storage unit 201, and acquires a camera capturing time associated with the received camera ID and GOP ID. Then, the alert notification unit 12 transmits an instruction for displaying an alert including the camera ID and the acquired camera capturing time to the display unit 13.

The display unit 13 displays an alert according to the alert display instruction. In this way, the monitoring apparatus 10 can provide an administrator performing monitoring with information representing date and time at which a moving object has been detected.

Furthermore, since the camera ID is provided to the administrator and thus the GOP of video data in which the moving object has been detected can be specified using the camera ID and a camera capturing time, when video data at this time is preserved, the preserved data can also be easily reproduced.

As described above, the monitoring apparatus 10 according to the present exemplary embodiment has the same functions as those of the monitoring center 1. Consequently, the monitoring apparatus 10 according to the present exemplary embodiment obtains the same effects as those of the monitoring center 1 according to the first exemplary embodiment.

Furthermore, in the monitoring apparatus 10 according to the present exemplary embodiment, the case in which all the servers included in the monitoring center 1 are implemented in one apparatus has been described as an example; however, the present invention is not limited thereto. It may be possible to employ a configuration in which some servers of the monitoring center 1 are implemented in one apparatus. For example, servers, except for the analysis servers 40 of the monitoring center 1, may also be implemented in one apparatus.

Fifth Exemplary Embodiment

Next, a fifth exemplary embodiment of the present invention will be described in detail with reference to the accompanying drawings. In the present exemplary embodiment, a video analysis apparatus included in the aforementioned monitoring centers 1, 4, and 5 or the monitoring apparatus 10 will be described. In addition, the video analysis apparatus according to the present exemplary embodiment will be described by employing the case in which members for performing each function are implemented in one apparatus as an example. However, the members for performing each function may also be respectively implemented by different servers, similarly to the first to third exemplary embodiments.

Figure 14:
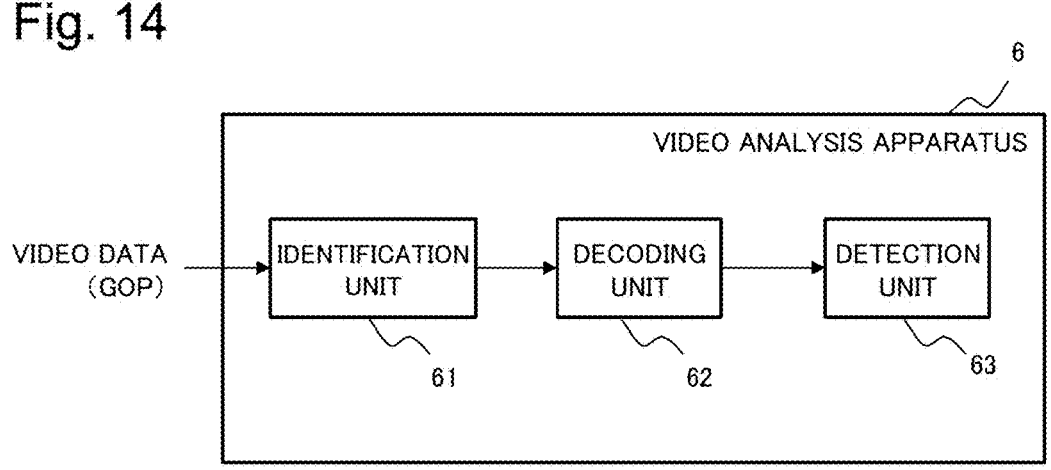
FIG. 14 is a functional block diagram illustrating an example of a functional configuration of a video analysis apparatus according to a fifth exemplary embodiment of the present invention.

FIG. 14 is a diagram illustrating an example of a configuration of a video analysis apparatus 6 according to the fifth exemplary embodiment of the present invention. As illustrated in FIG. 14, the video analysis apparatus 6 according to the present exemplary embodiment includes an identification unit 61, a decoding unit 62, and a detection unit 63.

The identification unit 61 corresponds to the identification server 30 in the aforementioned first exemplary embodiment. The identification unit 61 receives video data which is received from an imaging device (for example, a monitoring camera) captured a monitored base and is divided in units of groups each including a plurality of frames in a chronological order. The group including the plurality of frames in the chronological order, for example, is a GOP.

The identification unit 61 identifies whether each divided group includes a difference frame with a data size of a predetermined threshold value or more. Then, when the identification unit 61 is determined that the group includes the difference frame with the data size of the predetermined threshold value or more, the identification unit 61 transmits the plurality of frames included in the group to the decoding unit 62.

The decoding unit 62 corresponds to the decoding unit 401 in the first exemplary embodiment. The decoding unit 62 performs a decoding process on the plurality of frames of the group determined to include the difference frame with the data size of the predetermined threshold value or more, which are transmitted from the identification unit 61. The decoding unit 62 transmits the group including the plurality of decoded frames to the detection unit 63.

The detection unit 63 corresponds to the analysis unit 402 in the first exemplary embodiment. The detection unit 63 performs image analysis on each frame decoded by the decoding unit 62. In this way, when a moving object is included in each frame, the detection unit 63 detects the moving object.

As described above, the identification unit 61 selects a group (a video section including a plurality of frames in a chronological order), for which image analysis is performed, in the state of compressed video data, so that it is possible to reduce the throughput of the decoding process performed by the decoding unit 62 and the image analysis performed by the detection unit 63.

In this way, the detection unit 63 can detect a moving object included in video data with a smaller throughput. Consequently, it is possible to preferably detect a moving object included in video data by using a smaller number of detection units 63. Consequently, in accordance with the video analysis apparatus 6 according to the present exemplary embodiment, it is possible to more preferably realize the video analysis apparatus 6 with reduced costs.

(Hardware Configuration)

Figure 15:
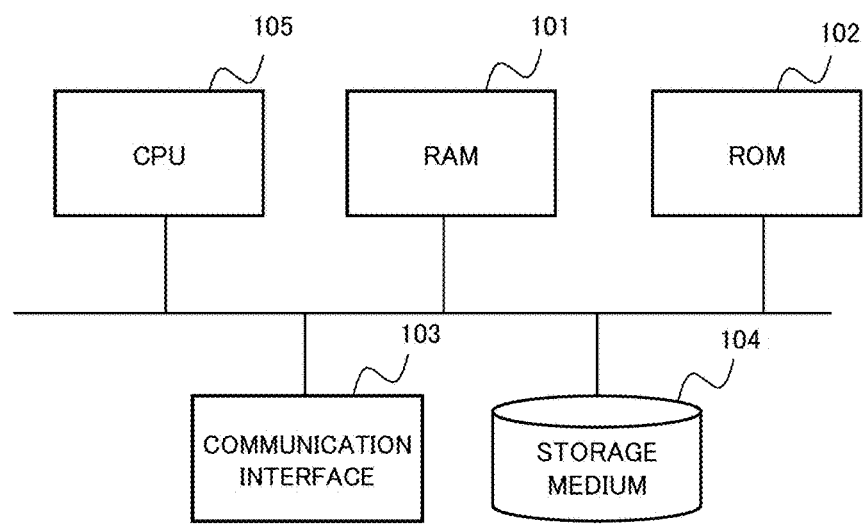
FIG. 15 is a diagram illustrating an example of a hardware configuration of each server of a monitoring center, a monitoring apparatus, or a video analysis apparatus, which can realize a monitoring system according to each exemplary embodiment of the present invention.

In addition, each unit included in each server of the monitoring centers illustrated in FIG. 4, FIG. 11, and FIG. 12, each unit of the monitoring apparatus illustrated in FIG. 13, or each unit of the video analysis apparatus illustrated in FIG. 14 may also be implemented with hardware resources exemplified in FIG. 15. That is, the configuration illustrated in FIG. 15 includes a RAM (Random Access Memory) 101, a ROM (Read Only Memory) 102, a communication interface 103, a storage medium 104, and a CPU 105. The CPU 105 loads various software programs (computer programs) stored in the ROM 102 or the storage medium 104 into the RAM 101 and executes the software programs, thereby controlling the entire operation of each server of the monitoring centers or the monitoring apparatus. That is, in each of the exemplary embodiments, the CPU 105 executes software programs for performing each function (each unit) of each server of the monitoring centers or the monitoring apparatus or each function (each unit) of the video analysis apparatus while appropriately referring to the ROM 102 or the storage medium 104.

Furthermore, the present invention described by employing each exemplary embodiment as an example is achieved by supplying computer programs capable of performing the aforementioned functions to each server of the monitoring centers, the monitoring apparatus, or the video analysis apparatus, and loading the computer programs into the RAM 101 and executing the computer programs by the CPU 105.

Furthermore, it is sufficient if the supplied computer programs are stored in a computer-readable storage device such as a readable/writable memory (a temporary storage medium) or a hard disk drive. In such a case, the present invention can be regarded to be configured by codes representing the computer programs or a storage medium storing the computer programs.

In the aforementioned each exemplary embodiment, as an example in which the CPU 105 illustrated in FIG. 15 performs the functions indicated by each block in each server of the monitoring centers illustrated in FIG. 4, FIG. 11, and FIG. 12, the monitoring apparatus illustrated in FIG. 13, or the video analysis apparatus illustrated in FIG. 14, the case in which the functions are performed by the software programs has been described. However, some or all of the functions indicated by each block illustrated in FIG. 4 and FIG. 11 to FIG. 14 may also be implemented as a hardware circuit.

A monitoring system including the monitoring apparatus, the monitoring center, and the video analysis apparatus according to each exemplary embodiment of the present invention can be preferably applied to a system that performs an analysis process on a video of a camera captured an unfrequented place with less motion.

Furthermore, in accordance with the monitoring system including the monitoring apparatus, the monitoring center, and the video analysis apparatus according to each exemplary embodiment, for example, when no moving object has been detected such as when traffic or a parade has been broken or when congestion has been broken, it may be configured such that an alert is given to an administrator. This, for example, can be realized when the identification unit identifies that traffic or a parade in a video has been broken or congestion has been broken in the case in which the data size of a difference frame of compression-coded video data is equal to or less than a constant value.

Furthermore, when the data quantity of the difference frame is large, it can be determined to be further congested, and only in congestion of a constant level or more, analysis can also be performed. Consequently, in accordance with the monitoring system according to each exemplary embodiment of the present invention, it is possible to identify the size of a motion in a video (many moving objects are included or not), a congestion situation of a person or an object in a video, the size and the like of a moving object by the data size of the difference frame of the compression-coded video data.

Furthermore, the monitoring system according to each exemplary embodiment of the present invention can also be used in a field of marketing analysis and the like based on video monitoring or video analysis. For example, the monitoring system can be applied to a system that detects in realtime a moving object such as a person or a vehicle from a plurality of monitoring camera videos and informs an administrator of the moving object, or a system that analyzes and reports the behavior of a person from a plurality of camera videos in a shop. In this way, it is possible to reduce the entire system throughput. Furthermore, the monitoring system can be applied to the case of simply extracting a video section, which may include a moving object, from preserved video data, and the like.

Furthermore, the monitoring system according to each exemplary embodiment of the present invention can be used in the temporary selection of learning data collection of machine learning such as the selection of the video section which may include a moving object and the search of learning data from the selected video section. In this way, it is possible to reduce a work load when selecting learning data with hands.

Some or all of the exemplary embodiments are described as the following Supplementary Notes, but are not limited to the following.

(Supplementary Note 1)

A video analysis apparatus including: an identification unit that identifies whether each divided group includes a difference frame with a data size of a predetermined threshold value or more, the group being configured from video data which is encoded video data received from an imaging device captured a monitored base and is divided in units of groups each including a plurality of frames in a chronological order; a decoding unit that performs a decoding process on the plurality of frames of the group identified by the identification unit to include the difference frame with the data size of the predetermined threshold value or more; and a detection unit that performs image analysis on the decoded each frame to detect a moving object.

(Supplementary Note 2)

The video analysis apparatus according to Supplementary Note 1, wherein the identification unit identifies whether the group satisfies at least one of (a) including at least one of the difference frames with the data sizes of the predetermined threshold value or more, (b) an average value of the data sizes of the difference frames included in the group is the predetermined threshold value or more, and (c) the difference frames with the data sizes of the predetermined threshold value or more are continuous by a predetermined number or more.

(Supplementary Note 3)

The video analysis apparatus according to Supplementary Note 1 or 2, further including: a video management information storage unit that stores a group identifier indicating the group and detection information representing whether a moving object has been detected from at least one frame included in the group indicated by the group identifier, in association with each other; and a transmission unit that transmits the group to be subjected to the decoding process to the decoding unit, wherein, with respect to each the divided group of the video data received from the imaging device, the transmission unit transmits the received group to the decoding unit when the detection information associated with a group identifier of a group immediately before the received group in a chronological order is information representing that the moving object has been detected, and transmits, to the decoding unit, the group identified by the identification unit to include the difference frame with the data size of the predetermined threshold value or more when the detection information is information representing that the moving object has not been detected, and wherein the decoding unit performs a decoding process on the plurality of frames of the group transmitted from the transmission unit.

(Supplementary Note 4)

The video analysis apparatus according to Supplementary Note 3, further including: a plurality of video analysis units each including the decoding unit and the detection unit; and an analysis information storage unit that manages whether the video analysis unit performs the decoding process or the image analysis, wherein the transmission units specifies a video analysis unit not performing the decoding process or the image analysis among the plurality of video analysis units, and transmits a group to be subjected to the decoding process to the decoding unit included in the specified video analysis unit.

(Supplementary Note 5)

The video analysis apparatus according to Supplementary Note 1 or 2, further including: a video management information storage unit that stores a group identifier indicating the group and detection information representing whether a moving object has been detected from at least one frame included in the group indicated by the group identifier, in association with each other; and a transmission unit that transmits the group or the frame to be subjected to the image analysis to the detection unit, wherein, with respect to each the divided group of the video data received from the imaging device, the transmission unit transmits the received group to the decoding unit and transmits the group decoded by the decoding unit to the detection unit when the detection information associated with a group identifier of a group immediately before the received group in a chronological order is information representing that the moving object has been detected, and transmits, in the group identified by the identification unit to include the difference frame with the data size of the predetermined threshold value or more, the difference frame decoded by the decoding unit to the detection unit, when the detection information is information representing that the moving object has not been detected.

(Supplementary Note 6)

The video analysis apparatus according to Supplementary Note 5, further including: a plurality of video analysis units each including the detection unit; and an analysis information storage unit that manages whether the video analysis unit performs the image analysis, wherein the transmission unit specifies a video analysis unit not performing the image analysis among the plurality of video analysis units, and transmits a group or a frame to be subjected to the image analysis to the specified video analysis unit.

(Supplementary Note 7)

The video analysis apparatus according to any one of Supplementary Notes 1 to 6, further including: a determination unit that determines whether the video data, which is the encoded video data received from the imaging device captured the monitored base and has been divided in units of groups each including the plurality of frames in the chronological order, is data to be subjected to the image analysis, wherein the determination unit transmits the video data determined to be the data to be subjected to the image analysis to the identification unit.

(Supplementary Note 8)

A monitoring apparatus including: an identification unit that identifies whether each divided group includes a difference frame with a data size of a predetermined threshold value or more, the group being configured from video data which is encoded video data received from an imaging device captured a monitored base and is divided in units of groups each including a plurality of frames in a chronological order; a decoding unit that performs a decoding process on the plurality of frames of the group identified by the identification unit to include the difference frame with the data size of the predetermined threshold value or more; a detection unit that performs image analysis on the decoded each frame to detect a moving object; and a notification unit that allows information representing that the moving object has been detected to be displayed on a display unit when the detection unit has detected the moving object.

(Supplementary Note 9)

The monitoring apparatus according to Supplementary Note 8, wherein the identification unit identifies whether the group satisfies at least one of (a) including at least one of the difference frames with the data sizes of the predetermined threshold value or more, (b) an average value of the data sizes of the difference frames included in the group is the predetermined threshold value or more, and (c) the difference frames with the data sizes of the predetermined threshold value or more are continuous by a predetermined number or more.

(Supplementary Note 10)

The monitoring apparatus according to Supplementary Note 8 or 9, further including: a video management information storage unit that stores a group identifier indicating the group and detection information representing whether a moving object has been detected from at least one frame included in the group indicated by the group identifier, in association with each other; and a transmission unit that transmits the group to be subjected to the decoding process to the decoding unit, wherein, with respect to each the divided group of the video data received from the imaging device, the transmission unit transmits the received group to the decoding unit when the detection information associated with a group identifier of a group immediately before the received group in a chronological order is information representing that the moving object has been detected, and transmits, to the decoding unit, the group identified by the identification unit to include the difference frame with the data size of the predetermined threshold value or more when the detection information is information representing that the moving object has not been detected, and wherein the decoding unit performs a decoding process on the plurality of frames of the group transmitted from the transmission unit.

(Supplementary Note 11)

The monitoring apparatus according to Supplementary Note 10, further including: a plurality of video analysis units each including the decoding unit and the detection unit; and an analysis information storage unit that manages whether the video analysis unit performs the decoding process or the image analysis, wherein the transmission units specifies a video analysis unit not performing the decoding process or the image analysis among the plurality of video analysis units, and transmits a group to be subjected to the decoding process to the decoding unit included in the specified video analysis unit.

(Supplementary Note 12)

The monitoring apparatus according to Supplementary Note 8 or 9, further including: a video management information storage unit that stores a group identifier indicating the group and detection information representing whether a moving object has been detected from at least one frame included in the group indicated by the group identifier, in association with each other; and a transmission unit that transmits the group or the frame to be subjected to the image analysis to the detection unit, wherein, with respect to each the divided group of the video data received from the imaging device, the transmission unit transmits the received group to the decoding unit and transmits the group decoded by the decoding unit to the detection unit when the detection information associated with a group identifier of a group immediately before the received group in a chronological order is information representing that the moving object has been detected, and transmits, in the group identified by the identification unit to include the difference frame with the data size of the predetermined threshold value or more, the difference frame decoded by the decoding unit to the detection unit, when the detection information is information representing that the moving object has not been detected.

(Supplementary Note 13)

The monitoring apparatus according to Supplementary Note 12, further including: a plurality of video analysis units each including the detection unit; and an analysis information storage unit that manages whether the video analysis unit performs the image analysis, wherein the transmission unit specifies a video analysis unit not performing the image analysis among the plurality of video analysis units, and transmits a group or a frame to be subjected to the image analysis to the specified video analysis unit.

(Supplementary Note 14)

The monitoring apparatus according to any one of Supplementary Notes 8 to 13, further including: a determination unit that determines whether the video data, which is the encoded video data received from the imaging device captured the monitored base and has been divided in units of groups each including the plurality of frames in the chronological order, is data to be subjected to the image analysis, wherein the determination unit transmits the video data determined to be the data to be subjected to the image analysis to the identification unit.

(Supplementary Note 15)

A monitoring system for monitoring a monitored base, including: a management server that receives decoded video data from an imaging device captured the monitored base, and divides and manages the received video data in units of groups each including a plurality of frames in a chronological order; an identification server that identifies whether each divided group includes a difference frame with a data size of a predetermined threshold value or more, the group being configured from the divided video data; an analysis server that performs a decoding process on the plurality of frames of the group identified by the identification server to include the difference frame with the data size of the predetermined threshold value or more and performs image analysis on the decoded each frame to detect a moving object; and a monitoring terminal including a display unit that displays information representing that a moving object has been detected according to an instruction from the management server when the analysis server has detected the moving object.

(Supplementary Note 16)

The monitoring system according to Supplementary Note 15, wherein the identification server identifies whether the group satisfies at least one of (a) including at least one of the difference frames with the data sizes of the predetermined threshold value or more, (b) an average value of the data sizes of the difference frames included in the group is the predetermined threshold value or more, and (c) the difference frames with the data sizes of the predetermined threshold value or more are continuous by a predetermined number or more.

(Supplementary Note 17)

The monitoring system according to Supplementary Note 15 or 16, wherein the management server includes a video management information storage unit that stores a group identifier indicating the group and detection information representing whether a moving object has been detected from at least one frame included in the group indicated by the group identifier, in association with each other, wherein, with respect to each the divided group of the video data received from the imaging device, the identification server transmits the received group to the analysis server when the detection information associated with a group identifier of a group immediately before the received group in a chronological order is information representing that the moving object has been detected, and transmits, to the analysis server, the group identified by the identification server to include the difference frame with the data size of the predetermined threshold value or more when the detection information is information representing that the moving object has not been detected, and wherein the analysis server performs a decoding process on the plurality of frames of the group transmitted from the identification server.

(Supplementary Note 18)

The monitoring system according to Supplementary Note 17, wherein the monitoring system includes a plurality of analysis servers, wherein the management server further includes an analysis information storage unit that manages whether the analysis servers perform the decoding process or the image analysis, and wherein the identification server specifies an analysis server not performing the decoding process or the image analysis among the plurality of analysis servers, and transmits a group to be subjected to the decoding process to the specified analysis server.

(Supplementary Note 19)

A monitoring system for monitoring a monitored base, including: a management server that receives decoded video data from an imaging device captured the monitored base, and divides and manages the received video data in units of groups each including a plurality of frames in a chronological order; an identification server including an identification unit that identifies whether each divided group includes a difference frame with a data size of a predetermined threshold value or more, the group being configured from the divided video data and a decoding unit that performs a decoding process on the plurality of frames of the group identified to include the difference frame with the data size of the predetermined threshold value or more, an analysis server that performs image analysis on the decoded each frame to detect a moving object; a monitoring terminal including a display unit that displays information representing that a moving object has been detected according to an instruction from the management server when the analysis server has detected the moving object.

(Supplementary Note 20)

The monitoring system according to Supplementary Note 19, wherein the identification server identifies whether the group satisfies at least one of (a) including at least one of the difference frames with the data sizes of the predetermined threshold value or more, (b) an average value of the data sizes of the difference frames included in the group is the predetermined threshold value or more, and (c) the difference frames with the data sizes of the predetermined threshold value or more are continuous by a predetermined number or more.

(Supplementary Note 21)

The monitoring system according to Supplementary Note 19 or 20, wherein the management server includes a video management information storage unit that stores a group identifier indicating the group and detection information representing whether a moving object has been detected from at least one frame included in the group indicated by the group identifier, in association with each other, and wherein the identification server further includes a transmit means that, with respect to each the divided group of the video data received from the imaging device, transmits the received group to the decoding unit and transmits the group decoded by the decoding unit to the analysis server when the detection information associated with a group identifier of a group immediately before the received group in a chronological order is information representing that the moving object has been detected, and transmits, in the group identified by the identification unit to include the difference frame with the data size of the predetermined threshold value or more, the difference frame decoded by the decoding unit to the analysis server, when the detection information is information representing that the moving object has not been detected.

(Supplementary Note 22)

The monitoring system according to Supplementary Note 21, wherein the monitoring system includes a plurality of analysis servers, wherein the management server further includes an analysis information storage unit that manages whether the analysis servers perform the image analysis, and wherein the transmit unit specifies analysis servers not performing the image analysis among the plurality of analysis servers, and transmits a group to be subjected to the image analysis to the specified analysis server.

(Supplementary Note 23)

A monitoring system for monitoring a monitored base, including: a management server that receives decoded video data from an imaging device captured the monitored base, and divides and manages the received video data in units of groups each including a plurality of frames in a chronological order; an identification server that identifies whether each divided group includes a difference frame with a data size of a predetermined threshold value or more, the group being configured from the divided video data; a decoding server that performs a decoding process on the plurality of frames of the group identified to include the difference frame with the data size of the predetermined threshold value or more; an analysis server that performs image analysis on the decoded each frame to detect a moving object; and a monitoring terminal including a display unit that displays information representing that a moving object has been detected according to an instruction from the management server when the analysis server has detected the moving object.

(Supplementary Note 24)

The monitoring system according to Supplementary Note 19, wherein the identification server identifies whether the group satisfies at least one of (a) including at least one of the difference frames with the data sizes of the predetermined threshold value or more, (b) an average value of the data sizes of the difference frames included in the group is the predetermined threshold value or more, and (c) the difference frames with the data sizes of the predetermined threshold value or more are continuous by a predetermined number or more.

(Supplementary Note 25)

The monitoring system according to Supplementary Note 24, wherein the monitoring system includes a plurality of analysis servers, wherein the management server further includes an analysis information storage unit that manages whether the analysis servers perform the image analysis, and the decoding server specifies analysis servers not performing the image analysis among the plurality of analysis servers, and transmits a decoded frame to be subjected to the image analysis to the specified analysis server.

(Supplementary Note 26)

The monitoring system according to any one of Supplementary Notes 15 to 25, wherein the management server determines whether the video data, which is the encoded video data received from the imaging device captured the monitored base and has been divided in units of groups each including the plurality of frames in the chronological order, is data to be subjected to the image analysis, and transmits the video data determined to be the data to be subjected to the image analysis to the identification server.

(Supplementary Note 27)

A video analysis method including: identifying whether each divided group includes a difference frame with a data size of a predetermined threshold value or more, the group being configured from video data which is encoded video data received from an imaging device captured a monitored base and is divided in units of groups each including a plurality of frames in a chronological order; performing a decoding process on the plurality of frames of the group identified to include the difference frame with the data size of the predetermined threshold value or more; and performing image analysis on the decoded each frame to detect a moving object.

(Supplementary Note 28)

A program causing a computer to perform a process of identifying whether each divided group includes a difference frame with a data size of a predetermined threshold value or more, the group being configured from video data which is encoded video data received from an imaging device captured a monitored base and is divided in units of groups each including a plurality of frames in a chronological order, a process of decoding the plurality of frames of the group identified to include the difference frame with the data size of the predetermined threshold value or more, and a process of performing image analysis on the decoded each frame to detect a moving object.

(Supplementary Note 29)

A computer-readable recording medium storing the program according to Supplementary Note 28.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A video analysis apparatus comprising:
a memory that stores a program; and
a processor configured to run the program stored in the memory that is configured to cause the processor to:
determine a group including a difference frame having a data size equal to or larger than a predetermined threshold value among a plurality of groups for an encoded video data received from an imaging device capturing a monitored base, the group including a plurality of frames in a chronological order, the encoded video data being divided into the plurality of groups,
perform a decoding process on the plurality of frames of the group determined to include the difference frame having the data size equal to or larger than the predetermined threshold value,
perform a detecting process that detects a moving object by performing image analysis on the plurality of frames on which the decoding process has performed, and determine whether the group satisfies at least one of
  (a) including the difference frame having the data size equal to or larger than the predetermined threshold value,
  (b) an average value of the data size of the difference frame included in the group is equal to or larger than the predetermined threshold value, or
  (c) the difference frame having the data size equal to or larger than the predetermined threshold value and at least one other difference frame being continuous by a number that is equal to or larger than a predetermined number.

2. The video analysis apparatus according to claim 1, wherein the program is further configured to cause the processor to:
store a group identifier indicating the group and detection information representing whether a moving object has been detected from at least one frame included in the group indicated by the group identifier, in association with each other; and
transmit the group to be subjected to the decoding process,
wherein, with respect to the group of the video data received from the imaging device, transmit the received group to the decoding process when the detection information associated with a group identifier of a group immediately before the received group in a chronological order is information representing that the moving object has been detected, and transmit, to the decoding process, the determined group to include the difference frame having the data size equal to or larger than the predetermined threshold value when the detection information is information representing that the moving object has not been detected, and
wherein the decoding process is performed on the plurality of frames of the group.

3. The video analysis apparatus according to claim 2, wherein the program is further configured to cause the processor to:
manage whether to perform the decoding process or the image analysis,
wherein the processor further comprises a plurality of video analysis units and is configured to specify one of the video analysis units to not perform the decoding process or the image analysis among the plurality of video analysis units, and transmit a group to be subjected to the decoding process in the specified video analysis unit.

4. The video analysis apparatus according to claim 1, wherein the program is further configured to cause the processor to:
store a group identifier indicating the group and detection information representing whether a moving object has been detected from at least one frame included in the group indicated by the group identifier, in association with each other; and
transmit the group or the frame to be subjected to the image analysis to the detecting process,
wherein, with respect to each the divided group of the video data received from the imaging device, transmit the received group to the decoding process and transmit the group decoded by the decoding process to the detecting process when the detection information associated with a group identifier of a group immediately before the received group in a chronological order is information representing that the moving object has been detected, and transmit, in the group identified to include the difference frame having the data size equal to or larger than the predetermined threshold value, the difference frame decoded by the decoding process to the detecting process, when the detection information is information representing that the moving object has not been detected.

5. The video analysis apparatus according to claim 4, wherein the program is further configured to cause the processor to:
manage whether to perform the image analysis,
wherein the processor further comprises a plurality of video analysis units and is configured to specify one of the video analysis units to not perform the image analysis among the plurality of video analysis units, and transmit a group or a frame to be subjected to the image analysis to the specified video analysis unit.

6. The video analysis apparatus according to claim 1, wherein the program is further configured to cause the processor to:
determine whether the video data, which is the encoded video data received from the imaging device capturing the monitored base and has been divided in units of groups each including the plurality of frames in the chronological order, is data to be subjected to the image analysis, and
transmit the video data determined to be the data to be subjected to the image analysis.

7. The video analysis apparatus according to claim 1, wherein the program is further configured to cause the processor to:
store a group identifier indicating the group and detection information representing whether a moving object has been detected from at least one frame included in the group indicated by the group identifier, in association with each other; and
transmit the group to be subjected to the decoding process,
wherein, with respect to each the divided group of the video data received from the imaging device, transmit the received group to the decoding process when the detection information associated with a group identifier of a group immediately before the received group in a chronological order is information representing that the moving object has been detected, and transmit, to the decoding process, the group identified to include the difference frame having the data size equal to or larger than the predetermined threshold value when the detection information is information representing that the moving object has not been detected, and
perform a decoding process on the plurality of frames of the group transmitted.

8. The video analysis apparatus according to claim 7, wherein the program is further configured to cause the processor to:
manage whether to perform the decoding process or the image analysis,
wherein the processor further comprises a plurality of video analysis units and is configured to specify one of the video analysis units to not perform the decoding process or the image analysis among the plurality of video analysis units, and transmit a group to be subjected to the decoding process in the specified video analysis unit.

9. The video analysis apparatus according to claim 1, wherein the program is further configured to cause the processor to:
store a group identifier indicating the group and detection information representing whether a moving object has been detected from at least one frame included in the group indicated by the group identifier, in association with each other; and
transmit the group or the frame to be subjected to the image analysis to the detecting process,
wherein, with respect to each the divided group of the video data received from the imaging device, transmit the received group to the decoding process and transmit the group decoded by the decoding process to the detecting process when the detection information associated with a group identifier of a group immediately before the received group in a chronological order is information representing that the moving object has been detected, and transmit, in the group identified by the identification unit to include the difference frame having the data size equal to or larger than the predetermined threshold value, the difference frame decoded by the decoding process to the detecting process, when the detection information is information representing that the moving object has not been detected.

10. The video analysis apparatus according to claim 9, wherein the program is further configured to cause the processor to:
manage whether to perform the image analysis,
wherein the processor further comprises a plurality of video analysis units and is configured to specify one of the video analysis units to not perform the image analysis among the plurality of video analysis units, and transmit a group or a frame to be subjected to the image analysis to the specified video analysis unit.

11. The video analysis apparatus according to claim 1, wherein the program is further configured to cause the processor to:
determine whether the video data, which is the encoded video data received from the imaging device capturing the monitored base and has been divided in units of groups each including the plurality of frames in the chronological order, is data to be subjected to the image analysis, and
transmit the video data determined to be the data to be subjected to the image analysis.

12. A monitoring system for monitoring a monitored base, comprising:
a management server that receives encoded video data from an imaging device capturing a monitored base, and divides and manages the received video data in units of groups each including a plurality of frames in a chronological order, the encoded video data being divided into the plurality of groups;
an identification server that determines a group including a difference frame having a data size equal to or larger than a predetermined threshold value among the plurality of groups for the encoded video data;
an analysis server that performs a decoding process on the plurality of frames of the group determined to include the difference frame having the data size equal to or larger than the predetermined threshold value and performs image analysis on the decoded frames to detect a moving object; and
a monitoring terminal including a display unit that displays information representing that a moving object has been detected according to an instruction from the management server when the analysis server has detected the moving object,
wherein the identification server identifies whether the group satisfies at least one of (a) including the difference frame having the data size equal to or larger than the predetermined threshold value,
(b) an average value of the data size of the difference frame included in the group is equal to or larger than the predetermined threshold value, or
(c) the difference frame having the data size equal to or larger than the predetermined threshold value and at least one other difference frame being continuous by a number that is equal to or larger than a predetermined number.

13. The monitoring system according to claim 12,
wherein the management server includes a video management information storage unit that stores a group identifier indicating the group and detection information representing whether a moving object has been detected from at least one frame included in the group indicated by the group identifier, in association with each other,
wherein, with respect to each the divided group of the video data received from the imaging device, the identification server transmits the received group to the analysis server when the detection information associated with a group identifier of a group immediately before the received group in a chronological order is information representing that the moving object has been detected, and transmits, to the analysis server, the group identified by the identification server to include the difference frame having the data size equal to or larger than the predetermined threshold value when the detection information is information representing that the moving object has not been detected, and
wherein the analysis server performs a decoding process on the plurality of frames of the group transmitted from the identification server.

14. The monitoring system according to claim 13,
wherein the monitoring system includes a plurality of analysis servers,
wherein the management server further includes an analysis information storage unit that manages whether the analysis servers perform the decoding process or the image analysis, and
wherein the identification server specifies an analysis server not performing the decoding process or the image analysis among the plurality of analysis servers, and transmits a group to be subjected to the decoding process to the specified analysis server.

15. The monitoring system according to claim 12,
wherein the management server includes a video management information storage unit that stores a group identifier indicating the group and detection information representing whether a moving object has been detected from at least one frame included in the group indicated by the group identifier, in association with each other,
wherein, with respect to each the divided group of the video data received from the imaging device, the identification server transmits the received group to the analysis server when the detection information associated with a group identifier of a group immediately before the received group in a chronological order is information representing that the moving object has been detected, and transmits, to the analysis server, the group identified by the identification server to include the difference frame having the data size equal to or larger than the predetermined threshold value when the detection information is information representing that the moving object has not been detected, and
wherein the analysis server performs a decoding process on the plurality of frames of the group transmitted from the identification server.

16. The monitoring system according to claim 15,
wherein the monitoring system includes a plurality of analysis servers,
wherein the management server further includes an analysis information storage unit that manages whether the analysis servers perform the decoding process or the image analysis, and
wherein the identification server specifies an analysis server not performing the decoding process or the image analysis among the plurality of analysis servers, and transmits a group to be subjected to the decoding process to the specified analysis server.

17. A video analysis method comprising:
determining a group including a difference frame having the data size equal to or larger than the predetermined threshold value among a plurality of groups for an encoded video data received from an imaging device capturing a monitored base, the group including a plurality of frames in a chronological order, the encoded video data being divided into the plurality of groups;
performing a decoding process on the plurality of frames of the group determined to include the difference frame having the data size equal to or larger than the predetermined threshold value;
detecting a moving object by performing image analysis on the plurality of frames on which the decoding process has performed; and
identifying whether the group satisfies at least one of
(a) including the difference frame having the data size equal to or larger than the predetermined threshold value,
(b) an average value of the data size of the difference frame included in the group is equal to or larger than the predetermined threshold value, or
(c) the difference frame having the data size equal to or larger than the predetermined threshold value and at least one other difference frame being continuous by a number that is equal to or larger than a predetermined number.

* * * * *